(12) United States Patent
Lee et al.

(10) Patent No.: US 10,651,897 B2
(45) Date of Patent: May 12, 2020

(54) NEAR FIELD COMMUNICATION PACKAGE AND PORTABLE DEVICE INCLUDING THE SAME

(71) Applicants: Sang-Hyo Lee, Incheon (KR);
Byeong-Taek Moon, Seoul (KR);
Il-Jong Song, Gyeonggi-do (KR);
Byeong-Hoon Lee, Seoul (KR)

(72) Inventors: Sang-Hyo Lee, Incheon (KR);
Byeong-Taek Moon, Seoul (KR);
Il-Jong Song, Gyeonggi-do (KR);
Byeong-Hoon Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 20 days.

(21) Appl. No.: 15/013,566

(22) Filed: Feb. 2, 2016

(65) Prior Publication Data
US 2016/0308587 A1 Oct. 20, 2016

(30) Foreign Application Priority Data

Apr. 14, 2015 (KR) .................. 10-2015-0052730
May 29, 2015 (KR) .................. 10-2015-0075771

(51) Int. Cl.
*H04B 5/00* (2006.01)
*H04W 4/80* (2018.01)

(52) U.S. Cl.
CPC ......... *H04B 5/0056* (2013.01); *H04B 5/0031* (2013.01); *H04B 5/0081* (2013.01); *H04W 4/80* (2018.02)

(58) Field of Classification Search
CPC .................. H04B 5/00–5/02; H04W 4/008
See application file for complete search history.

(56) References Cited

U.S. PATENT DOCUMENTS

| 6,592,043 B1 * | 7/2003 | Britton ................. G06K 19/027 |
| | | 235/488 |
| 8,528,812 B2 | 9/2013 | Gannon |
| 8,626,066 B2 | 1/2014 | Geslin et al. |
| 8,684,267 B2 | 4/2014 | Foo et al. |
| 8,881,989 B2 | 11/2014 | Mullen et al. |
| 8,910,879 B2 | 12/2014 | Goldman et al. |
| 8,925,806 B2 | 1/2015 | Bonalle et al. |

(Continued)

FOREIGN PATENT DOCUMENTS

| CN | 101107615 | 1/2008 |
| CN | 101334855 | 12/2008 |

(Continued)

OTHER PUBLICATIONS

Chinese Office Action dated Jan. 2, 2020 issued in counterpart application No. 201610160355.6, 15 pages.

*Primary Examiner* — Gennadiy Tsvey
(74) *Attorney, Agent, or Firm* — The Farrell Law Firm, P.C.

(57) ABSTRACT

A near field communication (NFC) package in a portable device and method thereof are provided. The NFC package includes a secure storage device configured to store data, and an NFC controller configured to receive data from the secure storage device, provide the received data to a first external terminal by performing an NFC communication in an NFC mode, and provide the received data to a second external terminal by performing a magnetic secure transmission (MST) communication in an MST mode.

9 Claims, 31 Drawing Sheets

(56) References Cited

U.S. PATENT DOCUMENTS

| | | | |
|---|---|---|---|
| 8,925,826 B2 | 1/2015 | Liu et al. | |
| 9,626,614 B2* | 4/2017 | Tramoni | G06K 19/0726 |
| 2003/0208105 A1* | 11/2003 | Newman | A61M 1/0281 |
| | | | 600/300 |
| 2006/0283958 A1* | 12/2006 | Osterweil | G06K 1/125 |
| | | | 235/492 |
| 2008/0148059 A1* | 6/2008 | Shapiro | G06F 21/32 |
| | | | 713/186 |
| 2009/0267736 A1* | 10/2009 | Watanabe | G06K 19/0723 |
| | | | 340/10.1 |
| 2010/0039146 A1* | 2/2010 | Park | H03K 17/005 |
| | | | 327/109 |
| 2010/0262503 A1 | 10/2010 | Florek et al. | |
| 2012/0280035 A1* | 11/2012 | Liu | G06Q 20/02 |
| | | | 235/380 |
| 2012/0319912 A1* | 12/2012 | Taguchi | G06K 19/07345 |
| | | | 343/788 |
| 2013/0160134 A1* | 6/2013 | Marcovecchio | G06Q 20/3563 |
| | | | 726/26 |
| 2013/0200999 A1* | 8/2013 | Spodak | G05B 1/01 |
| | | | 340/5.65 |
| 2013/0320080 A1* | 12/2013 | Olson | H04W 76/10 |
| | | | 235/380 |
| 2014/0154980 A1* | 6/2014 | Jang | H04B 5/0025 |
| | | | 455/41.1 |
| 2014/0203902 A1 | 7/2014 | Shippee et al. | |
| 2015/0069126 A1* | 3/2015 | Leon | G06K 19/06206 |
| | | | 235/449 |
| 2015/0235204 A1* | 8/2015 | Wallner | G06Q 20/3278 |
| | | | 705/39 |
| 2015/0371234 A1* | 12/2015 | Huang | G06Q 20/36 |
| | | | 705/44 |
| 2016/0148193 A1 | 5/2016 | Kelley et al. | |
| 2016/0203472 A1* | 7/2016 | Wallner | G06Q 20/341 |
| | | | 705/41 |
| 2016/0328636 A1* | 11/2016 | Marseille | G06K 19/06206 |

FOREIGN PATENT DOCUMENTS

| | | | | |
|---|---|---|---|---|
| CN | 101770670 | | 7/2010 | |
| KR | 20160121279 A | * | 10/2016 | |
| WO | WO-2010022129 A1 | * | 2/2010 | G06K 19/06187 |
| WO | WO 2014/113278 | | 7/2014 | |

* cited by examiner

FIG. 6
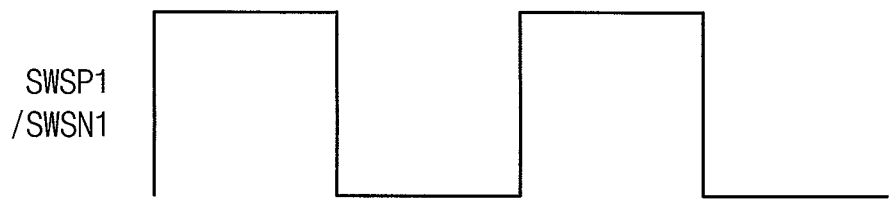
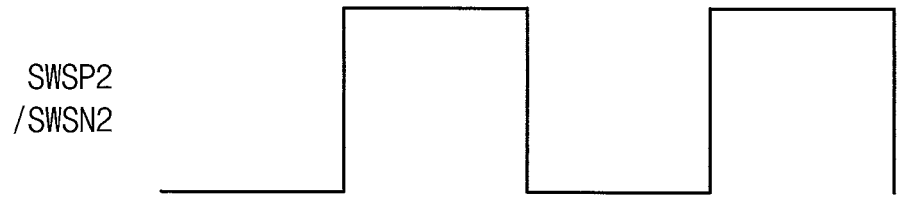
FIG. 7
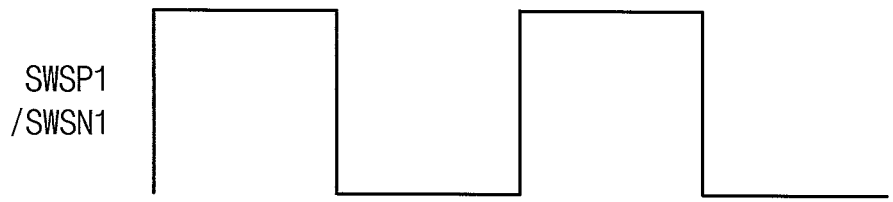
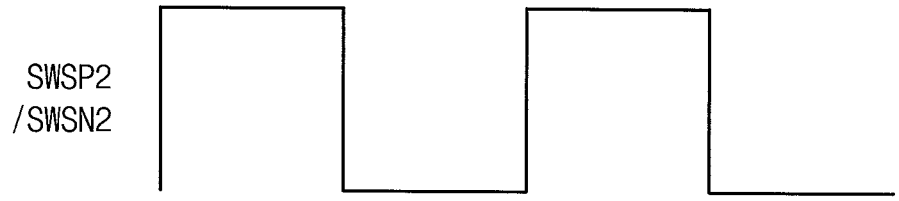

FIG. 8A
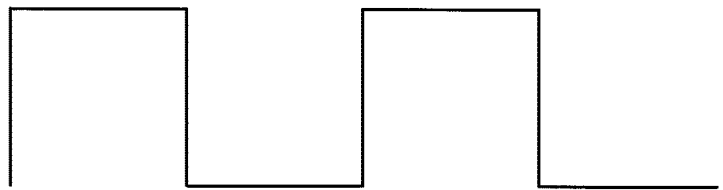
SWSP1/SWSN1
SWSP2/SWSN2
FIG. 8B
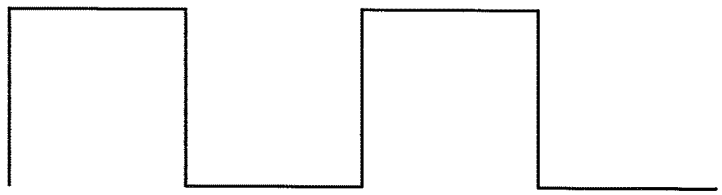
SWSP1/SWSN1
SWSP2
SWSN2

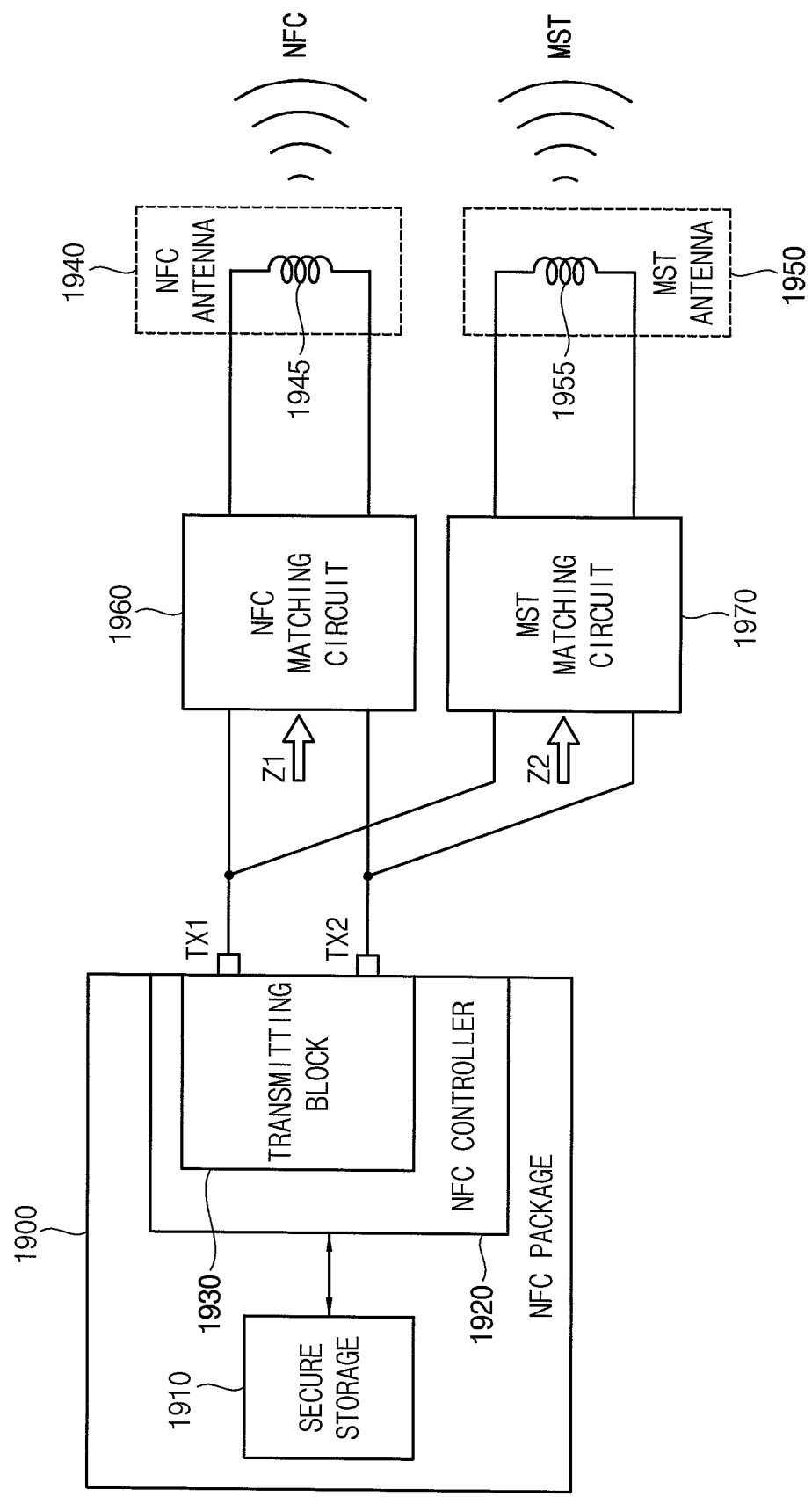

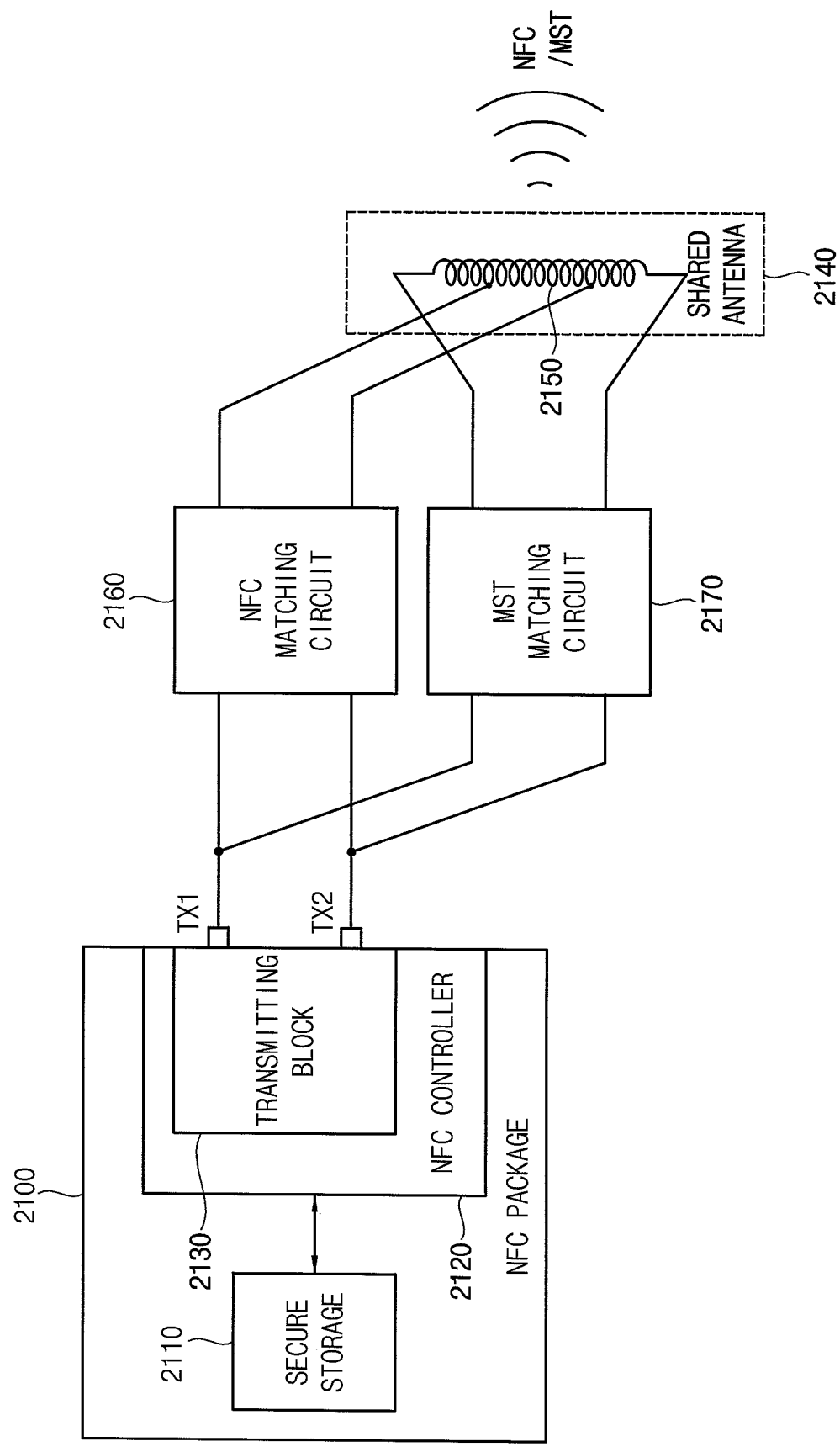

NEAR FIELD COMMUNICATION PACKAGE AND PORTABLE DEVICE INCLUDING THE SAME

PRIORITY

This application claims priority under 35 U.S.C. § 119(a) to a Korean Patent Application filed on Apr. 14, 2015 in the Korean Intellectual Property Office and assigned Serial No. 10-2015-0052730, and to a Korean Patent Application filed on May 29, 2015 in the Korean Intellectual Property Office and assigned Serial No. 10-2015-0075771, the entire contents of each of which are incorporated herein by reference.

BACKGROUND

1. Field of the Disclosure

The present disclosure relates generally to an electronic device and, more particularly, to a near field communication (NFC) package and portable device including the NFC package.

2. Description of the Related Art

A portable device, such as a smart phone, has been widely used because of its high portability. Recently, a portable device having NFC functionality has been developed to allow a portable device to provide various services. For example, a portable device in which an NFC package is embedded may provide a payment service that provides a card payment through an NFC communication using the NFC package. However, in a number of countries, payment terminals supporting NFC communication are not widely distributed, and thus an NFC payment service may not yet be useful.

SUMMARY

An aspect of the present disclosure provides an NFC package that performs a magnetic secure transmission (MST) communication as well as an NFC communication.

Another aspect of the present disclosure provides a portable device including an NFC package that performs an MST communication as well as an NFC communication.

Another aspect of the present disclosure provides that a secure storage device may be a secure element having a tamper-resistant function.

Another aspect of the present disclosure provides that an NFC controller may include a transmitting block having first and second transmitting terminals connected to both an NFC antenna and an MST antenna, the transmitting block configured to drive the NFC antenna connected to the first and second transmitting terminals to perform an NFC communication in an NFC mode, and to drive the MST antenna connected to the first and second transmitting terminals to perform an MST communication in an MST mode.

Another aspect of the present disclosure provides that the transmitting block may include a first driver configured to output a first electrical signal to a first transmitting terminal, a second driver configured to output a second electrical signal to a second transmitting terminal, and a gate controller configured to control the first driver and the second driver.

Another aspect of the present disclosure provides that a gate controller may operate first and second drivers with a first operating frequency in an NFC mode, and may operate the first and second drivers with a second operating frequency lower than the first operating frequency in an MST mode.

Another aspect of the present disclosure provides that a gate controller may control first and second drivers such that a first electrical signal output by the first driver and a second electrical signal output by the second driver have opposite phases.

Another aspect of the present disclosure provides that a gate controller may control first and second drivers such that a first electrical signal output by the first driver and a second electrical signal output by the second driver have the same phase.

Another aspect of the present disclosure provides that a gate controller may activate one of first and second drivers, and may deactivate the other of the first and second drivers.

Another aspect of the present disclosure provides that a gate controller may generate a first switching signal, a second switching signal, a third switching signal and a fourth switching signal. A first driver may include a first p-channel metal oxide semiconductor (PMOS) transistor configured to selectively connect a first transmitting terminal to a first power supply voltage in response to the first switching signal, and a first n-channel metal oxide semiconductor (NMOS) transistor configured to selectively connect the first transmitting terminal to a second power supply voltage in response to the second switching signal. The first driver may include a second PMOS transistor configured to selectively connect a second transmitting terminal to the first power supply voltage in response to the third switching signal, and a second NMOS transistor configured to selectively connect the second transmitting terminal to the second power supply voltage in response to the fourth switching signal.

Another aspect of the present disclosure provides that a gate controller may generate first and second switching signals such that a low level period of the first switching signal does not overlap a high level period of the second switching signal, and may generate third and fourth switching signals such that a low level period of the third switching signal does not overlap a high level period of the fourth switching signal.

Another aspect of the present disclosure provides that an NFC antenna may include a first loop coil, and an MST antenna may include a second loop coil. First and second transmitting terminals of a transmitting block may be connected to the first loop coil of the NFC antenna via a first impedance matching circuit, and may be directly connected to the second loop coil of the MST antenna. The transmitting block may perform an NFC communication using the first loop coil in an NFC mode, and may perform an MST communication using the second loop coil in an MST mode.

Another aspect of the present disclosure provides that a first impedance matching circuit may include a first capacitor connected between a first end of a first loop coil and a second end of the first loop coil, a second capacitor connected between the first end of the first loop coil and a first transmitting terminal of a transmitting block, and a third capacitor connected between the second end of the first loop coil and a second transmitting terminal of the transmitting block.

Another aspect of the present disclosure provides that a first impedance matching circuit may include a fourth capacitor having a first electrode connected to a first node between a first transmitting terminal of a transmitting block and a second capacitor, and a second electrode connected to a second node between a second transmitting terminal of the transmitting block and a third capacitor.

Another aspect of the present disclosure provides that a first impedance matching circuit may further include a first inductor connected between a first transmitting terminal of a transmitting block and a first node, and a second inductor connected between a second transmitting terminal of the transmitting block and a second node.

Another aspect of the present disclosure provides that a first loop coil and a second loop coil may be located in the same layer.

Another aspect of the present disclosure provides that first and second loop coils may be disposed such that one of the first and second loop coils surrounds the other.

Another aspect of the present disclosure provides that a magnetic sheet may be disposed under first and second loop coils.

Another aspect of the present disclosure provides that a second loop coil may have a structure including a first loop for forming a current path in a counterclockwise direction, and a second loop adjacent to the first loop for forming a current path in a clockwise direction.

Another aspect of the present disclosure provides that a first magnetic sheet may be disposed under a second loop coil, and a second magnetic sheet may be disposed over a region between first and second loops of the second loop coil.

Another aspect of the present disclosure provides that first and second transmitting terminals of a transmitting block may be connected to at least part of a shared loop coil via a first impedance matching circuit, and may be directly connected to first and second ends of the shared loop coil. The transmitting block may perform an NFC communication using the at least part of the shared loop coil as an NFC antenna in an NFC mode, and may perform an MST communication using the shared loop coil as an MST antenna in an MST mode.

Another aspect of the present disclosure provides that an NFC antenna may include a first loop coil, and an MST antenna may include a second loop coil having one end that is grounded and a third loop coil having one end that is grounded. First and second transmitting terminals of a transmitting block may be connected to the first loop coil of the NFC antenna via a first impedance matching circuit. The first transmitting terminal of the transmitting block may be directly connected to the second loop coil of the MST antenna, and the second transmitting terminal of the transmitting block may be directly connected to the third loop coil of the MST antenna. The transmitting block may perform an NFC communication using the first loop coil in an NFC mode, and may perform an MST communication using the second loop coil and third loop coil in an MST mode.

Another aspect of the present disclosure provides that in an MST mode, a gate controller may control first and second drivers such that a first electrical signal output by the first driver and a second electrical signal output by the second driver have the same phase.

Another aspect of the present disclosure provides that a second loop coil may have a first loop shape for forming a current path in a counterclockwise direction, and a third loop coil may have a second loop shape for forming a current path in a clockwise direction.

Another aspect of the present disclosure provides that a first magnetic sheet may be disposed under second and third loop coils, and a second magnetic sheet may be disposed over a region between the second loop coil and the third loop coil.

Another aspect of the present disclosure provides that an NFC antenna may include a first loop coil, and an MST antenna may include a second loop coil. First and second transmitting terminals of a transmitting block may be connected to the first loop coil of the NFC antenna via a first impedance matching circuit, and may be further connected to the second loop coil of an MST antenna via a second impedance matching circuit. The transmitting block may perform an NFC communication using the first loop coil in an NFC mode, and may perform an MST communication using the second loop coil in an MST mode.

Another aspect of the present disclosure provides that a second impedance matching circuit may include a first capacitor connected between a first end of a second loop coil and a first transmitting terminal of a transmitting block, and a second capacitor connected between a second end of the second loop coil and a second transmitting terminal of the transmitting block.

Another aspect of the present disclosure provides that a second impedance matching circuit may include a first switch connected between a first end of a second loop coil and a first transmitting terminal of a transmitting block, and a second switch connected between a second end of the second loop coil and a second transmitting terminal of the transmitting block.

Another aspect of the present disclosure provides that first and second transmitting terminals of a transmitting block may be connected to at least part of a shared loop coil via a first impedance matching circuit, and may be further connected to first and second ends of the shared loop coil via a second impedance matching circuit. The transmitting block may perform an NFC communication using the at least part of the shared loop coil as an NFC antenna in an NFC mode, and may perform an MST communication using the shared loop coil as an MST antenna in an MST mode.

Another aspect of the present disclosure provides that an NFC antenna may include a first loop coil, and an MST antenna may include a second loop coil having one end that is grounded and a third loop coil having one end that is grounded. First and second transmitting terminals of a transmitting block may be connected to the first loop coil of the NFC antenna via a first impedance matching circuit. The first transmitting terminal of the transmitting block may be further connected to the second loop coil of the MST antenna via a second impedance matching circuit, and the second transmitting terminal of the transmitting block may be further connected to the third loop coil of the MST antenna via a third impedance matching circuit. The transmitting block may perform an NFC communication using the first loop coil in an NFC mode, and may perform an MST communication using the second loop coil and the third loop coil in an MST mode.

Another aspect of the present disclosure provides that an NFC controller may include an NFC transmitting block having first and second transmitting terminals connected to an NFC antenna, the NFC transmitting block configured to drive the NFC antenna connected to the first and second transmitting terminals to perform an NFC communication in an NFC mode, and an MST transmitting block having third and fourth transmitting terminals connected to an MST antenna, the MST transmitting block configured to drive the MST antenna connected to the third and fourth transmitting terminals to perform an MST communication in an MST mode.

Another aspect of the present disclosure provides that an NFC antenna may include a first loop coil, and an MST antenna may include a second loop coil. First and second transmitting terminals of an NFC transmitting block may be connected to the first loop coil of the NFC antenna via a first impedance matching circuit. Third and fourth transmitting terminals of the MST transmitting block may be connected to the second loop coil of the MST antenna via a second impedance matching circuit. The NFC transmitting block may perform an NFC communication using the first loop coil in an NFC mode, and the MST transmitting block may perform an MST communication using the second loop coil in an MST mode.

Another aspect of the present disclosure provides that first and second transmitting terminals of an NFC transmitting block may be connected to at least part of a shared loop coil via a first impedance matching circuit, and third and fourth transmitting terminals of an MST transmitting block may be directly connected to first and second ends of the shared loop coil via a second impedance matching circuit. The NFC transmitting block may perform an NFC communication using the at least part of the shared loop coil as an NFC antenna in an NFC mode, and the MST transmitting block may perform an MST communication using the shared loop coil as an MST antenna in an MST mode.

Another aspect of the present disclosure provides that an NFC antenna may include a first loop coil, and an MST antenna may include a second loop coil having one end that is grounded and a third loop coil having one end that is grounded. First and second transmitting terminals of an NFC transmitting block may be connected to the first loop coil of the NFC antenna via a first impedance matching circuit, a third transmitting terminal of an MST transmitting block may be connected to the second loop coil of the MST antenna via a second impedance matching circuit, and a fourth transmitting terminal of the MST transmitting block may be connected to a third loop coil of the MST antenna via a third impedance matching circuit. The NFC transmitting block may perform an NFC communication using the first loop coil in an NFC mode, and the MST transmitting block may perform an MST communication using the second loop coil and the third loop coil in an MST mode.

Another aspect of the present disclosure provides that an NFC controller may include a first transmitting block having first and second transmitting terminals connected to a first NFC antenna and a first MST antenna, the first transmitting block configured to drive the first NFC antenna connected to the first and second transmitting terminals to perform an NFC communication in an NFC mode, and to drive the first MST antenna connected to the first and second transmitting terminals to perform an MST communication in an MST mode, and a second transmitting block having third and fourth transmitting terminals connected to a second NFC antenna and a second MST antenna, the second transmitting block configured to drive the second NFC antenna connected to the first and second transmitting terminals to perform an NFC communication in the NFC mode, and to drive the second MST antenna connected to the first and second transmitting terminals to perform an MST communication in the MST mode.

Another aspect of the present disclosure provides that a first NFC antenna may include a first loop coil, a first MST antenna includes a second loop coil, a second NFC antenna includes a third loop coil, and a second MST antenna may include a fourth loop coil. First and second transmitting terminals of a first transmitting block may be connected to the first loop coil of the first NFC antenna via a first impedance matching circuit, and may be further connected to the second loop coil of the first MST antenna via a second impedance matching circuit. Third and fourth transmitting terminals of a second transmitting block may be connected to the third loop coil of the second NFC antenna via a third impedance matching circuit, and may be further connected to the fourth loop coil of the second MST antenna via a fourth impedance matching circuit. The first transmitting block may perform an NFC communication using the first loop coil in an NFC mode, and may perform an MST communication using the second loop coil in an MST mode. The second transmitting block may perform an NFC communication using the third loop coil in the NFC mode, and may perform an MST communication using the fourth loop coil in the MST mode.

Another aspect of the present disclosure provides that first and second transmitting terminals of a first transmitting block may be connected to at least part of a first shared loop coil via a first impedance matching circuit, and may be further connected to first and second ends of the first shared loop coil via a second impedance matching circuit. Third and fourth transmitting terminals of a second transmitting block may be connected to at least part of a second shared loop coil via a third impedance matching circuit, and may be further connected to third and fourth ends of the second shared loop coil via a fourth impedance matching circuit. The first transmitting block may perform an NFC communication using the at least part of the first shared loop coil as an NFC antenna in an NFC mode, and may perform an MST communication using the first shared loop coil as an MST antenna in an MST mode. The second transmitting block may perform an NFC communication using the at least part of the second shared loop coil as an NFC antenna in the NFC mode, and may perform an MST communication using the second shared loop coil as an MST antenna in the MST mode.

Another aspect of the present disclosure provides that a secure storage device, an NFC controller and an MST integrated circuit or chip may be packaged as one package using a system-in-package (SIP) technique.

Another aspect of the present disclosure provides that an NFC controller may include an NFC transmitting block having first and second transmitting terminals connected to an NFC antenna, the NFC transmitting block configured to drive the NFC antenna connected to the first and second transmitting terminals to perform an NFC communication in an NFC mode. An MST chip may include an MST transmitting block having third and fourth transmitting terminals connected to an MST antenna, the MST transmitting block configured to drive the MST antenna connected to the third and fourth transmitting terminals to perform an MST communication in an MST mode.

Another aspect of the present disclosure provides that an NFC antenna may include a first loop coil, and an MST antenna may include a second loop coil. First and second transmitting terminals of an NFC transmitting block may be connected to the first loop coil of the NFC antenna via a first impedance matching circuit, and third and fourth transmitting terminals of an MST transmitting block may be connected to the second loop coil of the MST antenna via a second impedance matching circuit. The NFC transmitting block may perform an NFC communication using the first loop coil in an NFC mode, and the MST transmitting block may perform an MST communication using the second loop coil in an MST mode.

Another aspect of the present disclosure provides that first and second transmitting terminals of an NFC transmitting block may be connected to at least part of a shared loop coil via a first impedance matching circuit, and third and fourth transmitting terminals of an MST transmitting block may be connected to first and second ends of the shared loop coil via a second impedance matching circuit. The NFC transmitting block of an NFC controller may perform an NFC communication using the at least part of the shared loop coil as an NFC antenna in an NFC mode, and the MST transmitting block of an MST chip may perform an MST communication using the shared loop coil as an MST antenna in an MST mode.

Another aspect of the present disclosure provides that an NFC package and a portable device including the NFC package according to an embodiment of the present disclosure can perform an MST communication as well as an NFC communication.

Another aspect of the present disclosure provides that an NFC package and a portable device including the NFC package according to an embodiment of the present disclosure can support an MST payment service through an MST communication as well as an NFC payment service through an NFC communication.

According to an aspect of the present disclosure, an NFC package in a portable device is provided. The NFC package includes a secure storage device configured to store data, and an NFC controller configured to receive data from the secure storage device, provide the received data to a first external terminal by performing an NFC communication in an NFC mode, and provide the received data to a second external terminal by performing an MST communication in an MST mode.

According to another aspect of the present disclosure, an NFC package in a portable device is provided. The NFC package includes a secure storage device configured to store data, and an NFC controller configured to receive data from the secure storage device, provide the received data to a first external terminal by performing an NFC communication in an NFC mode, and provide the received data to an MST integrated circuit in an MST mode, wherein the MST integrated circuit is connected to the NFC controller and is configured to provide the data received from the NFC controller to a second external terminal by performing an MST communication in the MST mode.

According to another aspect of the present disclosure, a portable device is provided. The portable device includes an NFC antenna, an MST antenna, and an NFC package connected to the NFC antenna and the MST antenna, wherein the NFC package includes a secure storage device configured to store data, and the NFC package is configured to provide data stored in the secure storage device to a first external terminal by performing an NFC communication using the NFC antenna in an NFC mode, and provide the data stored in the secure storage device to a second external terminal by performing an MST communication using the MST antenna in an MST mode.

According to another aspect of the present disclosure, a method of NFC in a package in a portable device is provided. The method includes storing data in a secure storage device; receiving, in an NFC controller, data stored in the secure storage device; providing, by the NFC controller, the received data to a first external terminal by performing an NFC communication in an NFC mode; and providing, by the NFC controller, the received data to a second external terminal by performing an MST communication in an MST mode.

According to another aspect of the present disclosure, a method of NFC in a package in a portable device is provided. The method includes storing data in a secure storage device; receiving, in an NFC controller, data stored in the secure storage device; providing, by the NFC controller, the received data to a first external terminal by performing an NFC communication in an NFC mode, providing, by the NFC controller, the received data to an MST integrated circuit in an MST mode, wherein the MST integrated circuit is connected to the NFC controller; and providing, by the MST integrated circuit, the data received from the NFC controller to a second external terminal by performing an MST communication in the MST mode.

According to another aspect of the present disclosure, a method of a portable device is provided. The method includes storing data in a secure storage device in an NFC package; providing, by the NFC package, data stored in the secure storage device to a first external terminal by performing an NFC communication using an NFC antenna in an NFC mode; and providing, by the NFC package, the data stored in the secure storage device to a second external terminal by performing an MST communication using an MST antenna in an MST mode.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 6 is a timing diagram of switching signals in a transmitting block of FIG. 5 that performs a differential operation according to an embodiment of the present disclosure;

FIG. 7 is a timing diagram of switching signals in a transmitting block of FIG. 5 that performs a double operation according to an embodiment of the present disclosure;

FIG. 8A is a timing diagram of switching signals in a transmitting block of FIG. 5 that performs a single operation according to an embodiment of the present disclosure;

FIG. 8B is a timing diagram of switching signals in a transmitting block of FIG. 5 that performs a single operation according to an embodiment of the present disclosure;

FIG. 19 is a block diagram of a connection relationship between an NFC package and NFC and MST antennas according to an embodiment of the present disclosure;

FIG. 21 is a block diagram of a connection relationship between an NFC package and a shared antenna according to an embodiment of the present disclosure;

DETAILED DESCRIPTION OF EMBODIMENTS OF THE PRESENT DISCLOSURE

Figure 1:
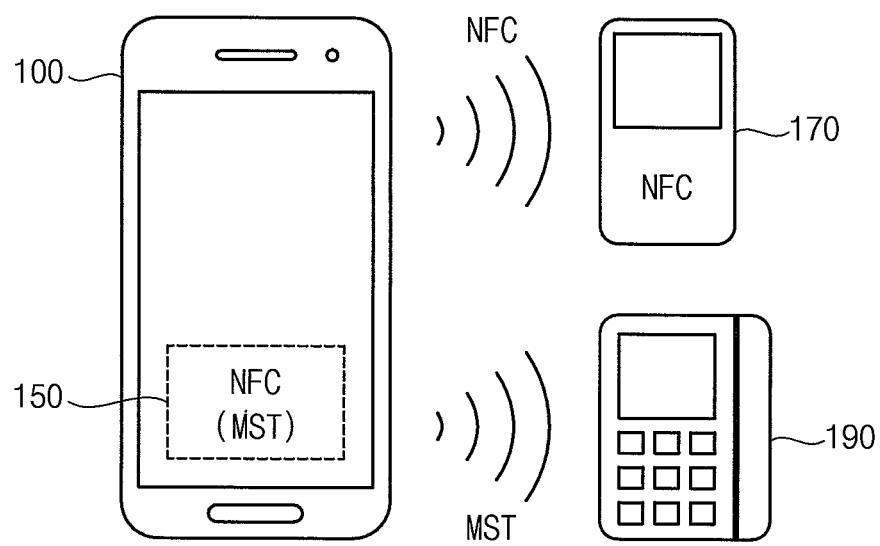
FIG. 1 is a diagram of a portable device according to an embodiment of the present disclosure.

Various embodiments of the present disclosure are described more fully hereinafter with reference to the accompanying drawings, in which some embodiments of the present disclosure are shown. The present disclosure may, however, be embodied in many different forms and should not be construed as being limited to the embodiments set forth herein. In the accompanying drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section described below could be referred to as a second element, component, region, layer or section without departing from the present disclosure.

Spatially relative terms, such as "beneath," "below," "lower," "above," "upper" and the like, may be used herein to describe one element or feature's relationship to another element(s) or feature(s) as illustrated in the accompanying drawings. It will be understood that the spatially relative terms are intended to encompass different orientations of a device in use or operation in addition to the orientation depicted in the accompanying drawings. For example, if a device in the accompanying drawings is turned over, elements described as "below" or "beneath" other elements or features would then be oriented "above" the other elements or features. Thus, the term "below" can encompass both an orientation of above and below. A device may be otherwise oriented (e.g., rotated 90 degrees or at other orientations) and the spatially relative descriptors used herein interpreted accordingly.

The terminology used herein is for the purpose of describing certain embodiments of the present disclosure only and is not intended to limit the present disclosure. As used herein, the singular forms "a," "an" and "the" are intended to include the plural forms as well, unless the context clearly indicates otherwise. It will be further understood that the terms "comprises" and/or "comprising," when used in the present disclosure, indicate the presence of stated features, integers, steps, operations, elements, and/or components, but do not preclude the presence or addition of one or more other features, integers, steps, operations, elements, components, and/or groups thereof.

Embodiments of the present disclosure are described herein with reference to cross-sectional illustrations that are schematic illustrations of embodiments of the present disclosure (and intermediate structures). As such, variations from the shapes of the illustrations as a result, for example, of manufacturing techniques and/or tolerances, are to be expected. Thus, the present disclosure should not be construed as being limited to the shapes of regions illustrated herein but are intended to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the accompanying drawings are examples and their shapes are not intended to illustrate the actual shape of a region of a device and are not intended to limit the scope of the present disclosure.

Unless otherwise defined, all terms used herein have the same meanings as commonly understood by one of ordinary skill in the art to which the present disclosure belongs. It will be further understood that terms, such as those defined in commonly used dictionaries, should be interpreted as having meanings that are consistent with their meanings in the context of the relevant art and should not be interpreted in an idealized or overly formal sense unless expressly so defined herein.

FIG. 1 is a diagram of a portable device 100 according to an embodiment of the present disclosure.

Referring to FIG. 1, the portable device 100 according to an embodiment of the present disclosure may include an NFC package 150 having MST functionality as well as NFC functionality. The NFC package 150 included (e.g., embedded) in the portable device 100 may perform an NFC communication with a first external terminal (e.g., an NFC reader or an NFC tag) 170, and may perform an MST communication with a second external terminal (e.g., a magnetic stripe (MS) reader) 190.

According to an embodiment of the present disclosure, the portable device 100 may be any portable electronic device, such as a cellular phone, a smart phone, a tablet computer, a laptop computer, a personal digital assistant (PDA), a portable multimedia player (PMP), a digital camera, a music player, a portable game console, a navigation system, etc. In an embodiment of the present disclosure, the portable device 100 may be any wearable electronic device, such as a smart watch, a wrist band electronic device, a necklace type electronic device, a glasses type electronic device, etc.

The NFC package 150 included in the portable device 100 may perform an NFC communication with the first external terminal 170 in an NFC mode. In an embodiment of the present disclosure, the NFC mode may include an NFC reader mode, a peer-to-peer (P2P) communication mode and/or an NFC card mode. In the NFC reader mode, the NFC package 150 may perform an NFC communication with an NFC tag (or an NFC card) as the first external terminal 170. For example, in the NFC reader mode, the NFC package 150 may read data from an NFC tag, or may write data to an NFC tag. In the P2P communication mode, the NFC package 150 may perform an NFC communication with another portable device as the first external terminal 170. For example, in the P2P communication mode, the NFC package 150 may perform a data transfer with another portable device. In the NFC card mode, the NFC package 150 may perform an NFC communication with an NFC reader as the first external terminal 170. For example, in the NFC card mode, the NFC package 150 may perform an electronic payment by providing payment data (e.g., credit card data) to an NFC reader.

The NFC package 150 included in the portable device 100 may further perform an MST communication with the second external terminal 190 in an MST mode. In an embodiment of the present disclosure, the second external terminal 190 may be an MS reader. For example, when a conventional MS card (e.g., a credit card, a debit card, etc.) is swiped across a head of an MS reader, a magnetic field may be generated, and the MS reader may receive MS card (e.g. credit card, debit card, etc.) data related to the swiped MS card based on the generated magnetic field to perform a payment based on the received MS card data. In an embodiment of the present disclosure, the NFC package 150 may store payment data (e.g., credit card data), and may provide the payment data to the MS reader through an MST communication in the MST mode. For example, to provide the payment data to the MS reader, the NFC package 150 may generate (or emulate) the same magnetic field (or the same magnetic field change) as the magnetic field generated when the conventional MS card is swiped across the head of the MS reader. Accordingly, even if a user of the portable device 100 does not carry the actual MS card (e.g., the credit card), the user can make the payment with the external payment terminal 170 and 190 using the portable device 100 including the NFC package 150. Further, the portable device 100 including the NFC package 150 not only may perform the payment with the first external terminal 170 through an NFC communication, but may also perform the payment with the second external terminal 190 through an MST communication.

As described above, the NFC package 150 and the portable device 100 including the NFC package 150 according to an embodiment of the present disclosure may perform an MST communication as well as an NFC communication, and thus may support an MST payment service through an MST communication as well as an NFC payment service through an NFC communication. Further, since the NFC package 150 performs an MST communication, a dedicated integrated circuit or chip for an MST communication is not required, which results in a reduction in cost and size.

Figure 2:
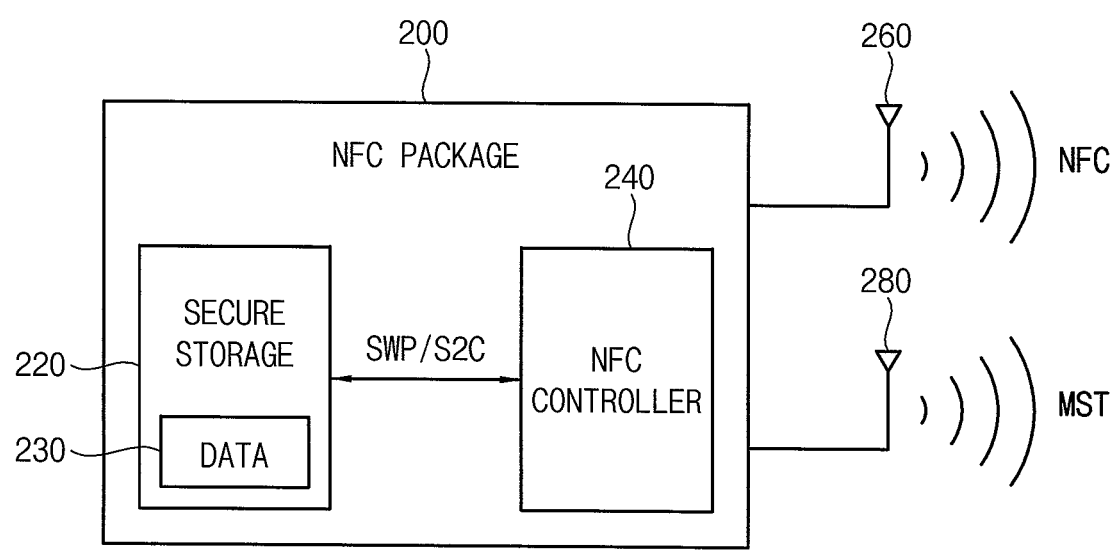
FIG. 2 is a block diagram of an NFC package according to an embodiment of the present disclosure.
Figure 3:
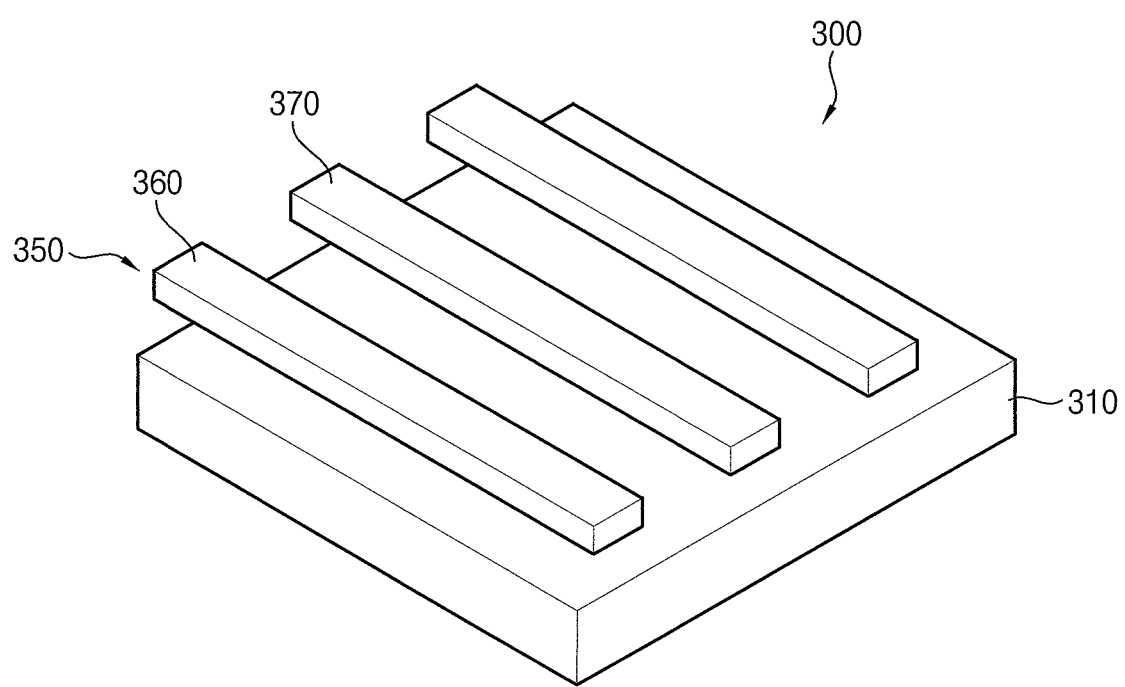
FIG. 3 is a diagram of a secure storage device included in an NFC package according to an embodiment of the present disclosure.

FIG. 2 is a block diagram of an NFC package 200 according to an embodiment of the present disclosure, and FIG. 3 is a diagram of a secure storage device 300 included in an NFC package according to an embodiment of the present disclosure.

Referring to FIG. 2, the NFC package 200 included in a portable device according to an embodiment of the present disclosure includes a secure storage device 220 and an NFC controller 240. In an embodiment of the present disclosure, the secure storage device 220 and the NFC controller 240 may be packaged as one package (i.e., the NFC package 200) using a SIP technique. In an embodiment of the present disclosure, the secure storage device 220 and the NFC controller 240 may be packaged in various forms, such as package on package (PoP), ball grid array (BGA), chip scale package (CSP), plastic leaded chip carrier (PLCC), plastic dual in-line package (PDIP), die in waffle pack (DIWP), die in wafer form (DIWF), chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), multi chip package (MCP), wafer-level fabricated package (WFP), or wafer-level processed stack package (WSP).

The secure storage device 220 may store data 230. The data 230 stored in the secure storage device 220 may include private data, confidential data or sensitive data that require security. For example, the data 230 stored in the secure storage device 220 may include payment data, such as credit card data, debit card data, etc.

In an embodiment of the present disclosure, the secure storage device 220 may be a secure element (SE) having tamper-resistant functionality to securely store the data 230. For example, the SE may have tamper-resistant functionality that protects against a tampering attack, such as a micro-probing attack, a software attack, an eavesdropping attack, a fault generation attack, etc. To achieve this functionality, the SE may include a fault detector, a power glitch detector, a laser detector, an abnormal condition detector, a reset detector, a metal shield, data path encryption, a true random number generator, etc. For example, as illustrated in FIG. 3, the secure storage device or SE 300 may include a substrate 310 and at least one metal wiring layer 350. The SE 300 may detect a change in capacitance between two metal lines 360 and 370 in the at least one metal wiring layer 350 to detect a tampering attack. In an embodiment of the present disclosure, the secure storage device 220 (or the SE 300) may be an embedded secure element (eSE). In an embodiment of the present disclosure, the secure storage device 220 (or the SE 300) may be a universal integrated circuit card (UICC), a micro secure digital (microSD) memory card, or the like.

The NFC controller 240 may be connected to the secure storage device 220, and may receive the data 230 from the secure storage device 220. In an embodiment of the present disclosure, the secure storage device 220 and the NFC controller 240 may interface with each other via a single wire protocol (SWP). In an embodiment of the present disclosure, the secure storage device 220 and the NFC controller 240 interface with each other via a signal-in/signal-out connection (S2C).

The NFC controller 240 may be further connected to an NFC antenna 260 and an MST antenna 280. In an embodiment of the present disclosure, the NFC antenna 260 and the MST antenna 280 may be physically separate antennas. In an embodiment of the present disclosure, a shared antenna may be selectively used as the NFC antenna 260 or the MST antenna 280. In an NFC mode, the NFC controller 240 may perform an NFC communication using the NFC antenna 260 to provide the data 230 received from the secure storage device 220 to a first external terminal (e.g., an external portable device, an NFC reader or an NFC tag). For example, the NFC controller 240 may perform data exchange with the first external terminal, or may perform an electronic payment through an NFC communication by providing payment data to the first external terminal. In an MST mode, the NFC controller 240 may perform an MST communication using the MST antenna 280 to provide the data 230 received from the secure storage device 220 to a second external terminal (e.g., an MS reader). For example, the NFC controller 240 may generate (or emulate) the same magnetic field (or the same magnetic field change) as a magnetic field generated when a conventional MS card is swiped across a head of an MS reader by using the MST antenna 280 to provide the payment data to the MS reader, and the MS reader may process the payment based on the payment data received from the NFC package 200 through an MST communication.

As described above, the NFC package 200 according to an embodiment of the present disclosure may perform an MST communication as well as an NFC communication, and thus may support an MST payment service through an MST communication as well as an NFC payment service through an NFC communication. Further, since the NFC package 200 performs an MST communication, a dedicated chip for MST communication is not required, which results in the reduction of cost and size.

Figure 4:
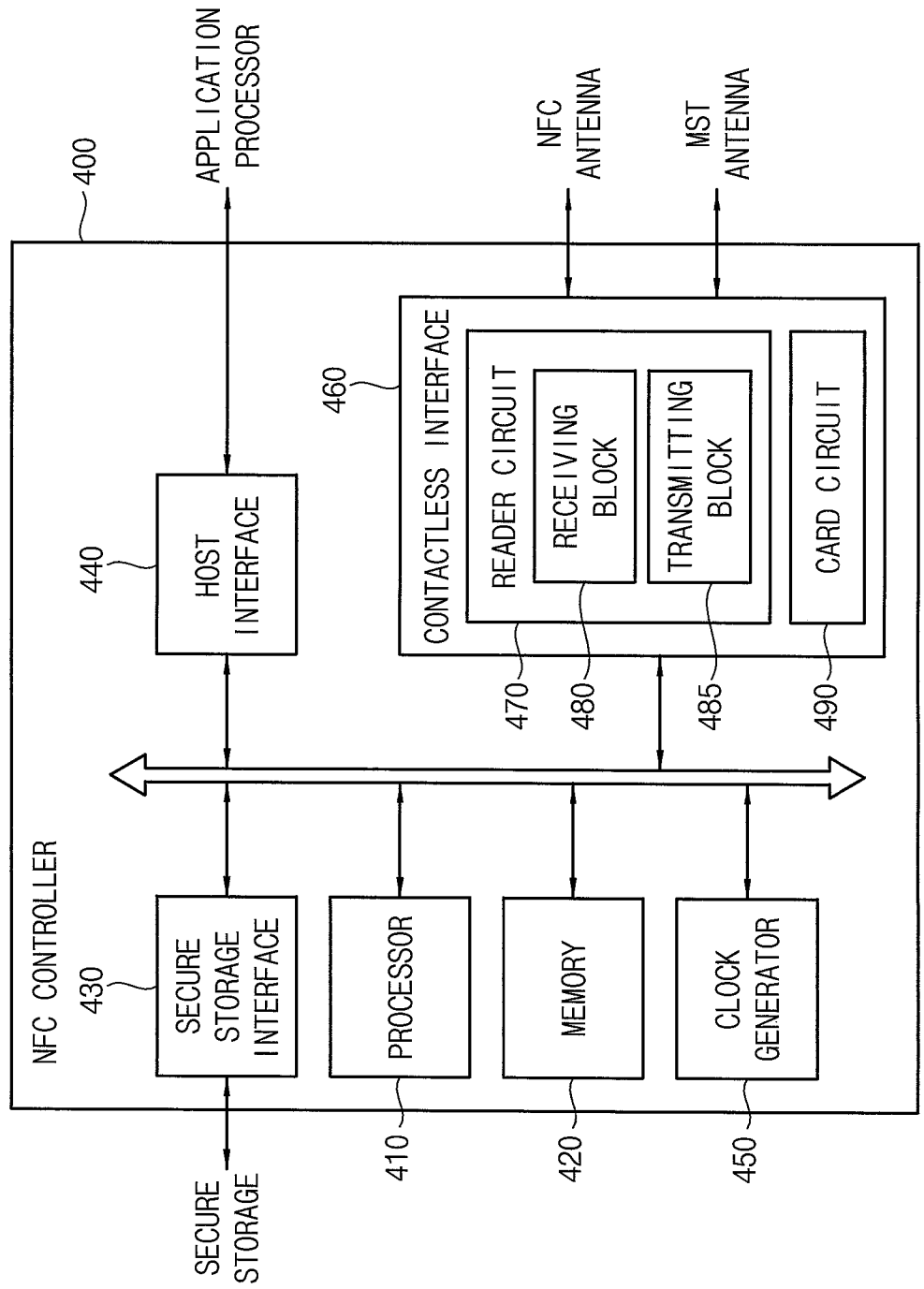
FIG. 4 is a block diagram of an NFC controller included in an NFC package according to an embodiment of the present disclosure.

FIG. 4 is a block diagram of an NFC controller 400 included in an NFC package according to an embodiment of the present disclosure.

Referring to FIG. 4, the NFC controller 400 included in an NFC package according to an embodiment of the present disclosure may include a processor 410, a memory 420, a secure storage interface 430, a host interface 440, a clock generator 450 and a contactless interface 460.

The processor 410 may control an overall operation of the NFC controller 400. The memory 420 may store data required for the operation of the NFC controller 400, or may store data to/from a secure storage device, a host (e.g., an application processor), or an external terminal (e.g., an NFC terminal or an MS reader). For example, the memory 420 may be a volatile memory, such as a static random access memory (SRAM). The secure storage interface 430 may be used to interface with the secure storage device (e.g., an SE) included in the NFC package, and the host interface 440 may be used to interface with a host, such as the application processor or a mobile system-on-chip (SoC). The clock generator 450 may generate a clock signal required for an operation of the NFC controller 400. Further, the clock generator 450 may provide a clock signal to the contactless interface 460.

The contactless interface 460 may be connected to an NFC antenna and an MST antenna. The contactless interface 460 may perform an NFC communication using the NFC antenna in an NFC mode, and may perform an MST communication using the MST antenna in an MST mode. In an embodiment of the present disclosure, the contactless interface 460 may include a reader circuit 470 and a card circuit 490. The reader circuit 470 may perform a receiving operation and a transmitting operation through an NFC communication in an NFC reader mode (or a P2P communication mode). For example, the reader circuit 470 may include a receiving block 480 that performs a receiving operation in the NFC reader mode, and a transmitting block 485 that performs a transmitting operation in the NFC reader mode. The card circuit 490 may perform a receiving operation and a transmitting operation through an NFC communication in an NFC card mode. For example, to perform the receiving operation in the NFC card mode, the card circuit 490 may include a regulator that regulates an electrical signal generated by the NFC antenna in response to a magnetic field from an external NFC terminal, and a demodulator that demodulates the regulated electrical signal. To perform a transmitting operation in the NFC card mode, the card circuit 490 may further include a load modulation circuit that performs a load modulation operation. In an embodiment of the present disclosure, the NFC controller 400 may perform active load modulation in the NFC card mode. In this case, to perform a transmitting operation in the NFC card mode, the transmitting block 485 of the reader circuit 470 may be activated.

In an NFC package according to an embodiment of the present disclosure, the transmitting block 485 of the reader circuit 470 may perform an MST communication using the MST antenna in an MST mode as well as an NFC communication using the NFC antenna in the NFC reader mode and/or the NFC card mode. Hereinafter, examples of configurations and operations of the transmitting block 485 are described below with reference to FIGS. 5 through 9.

Figure 5:
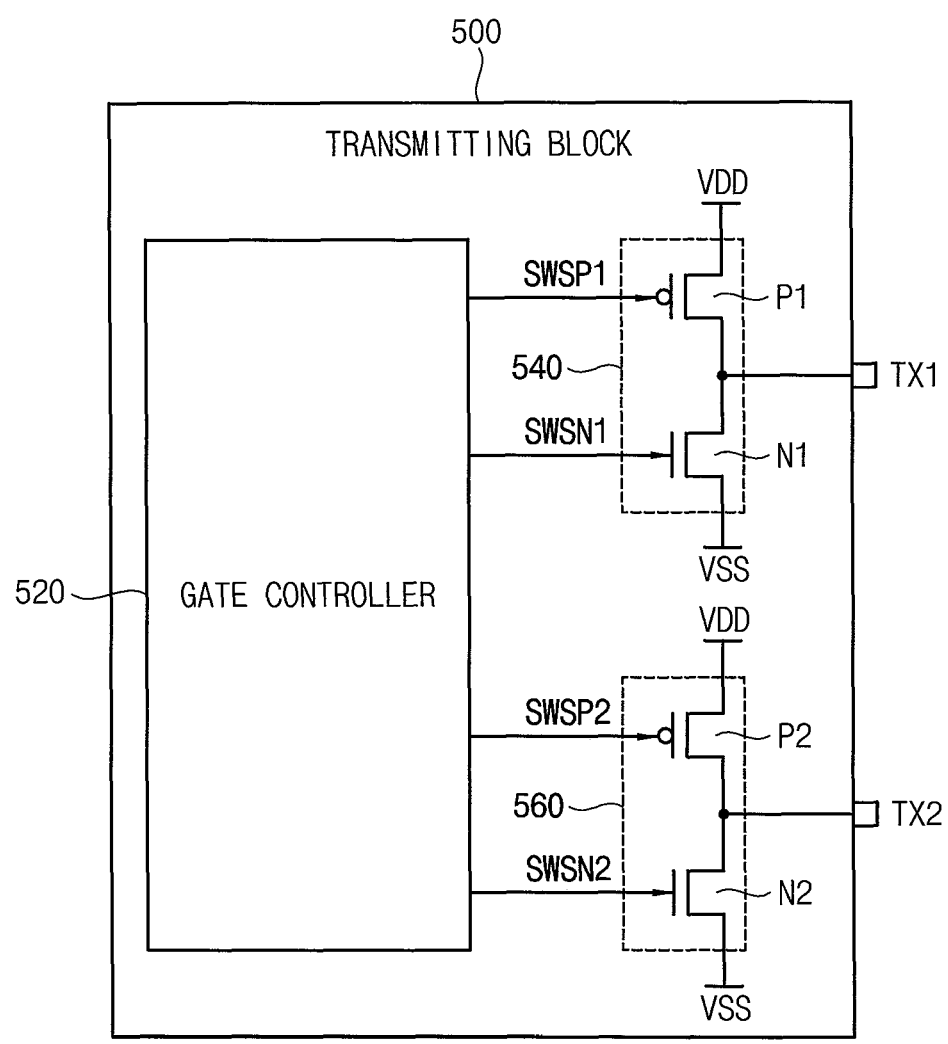
FIG. 5 is a block diagram of a transmitting block included in an NFC controller of an NFC package according to an embodiment of the present disclosure.
Figure 9:
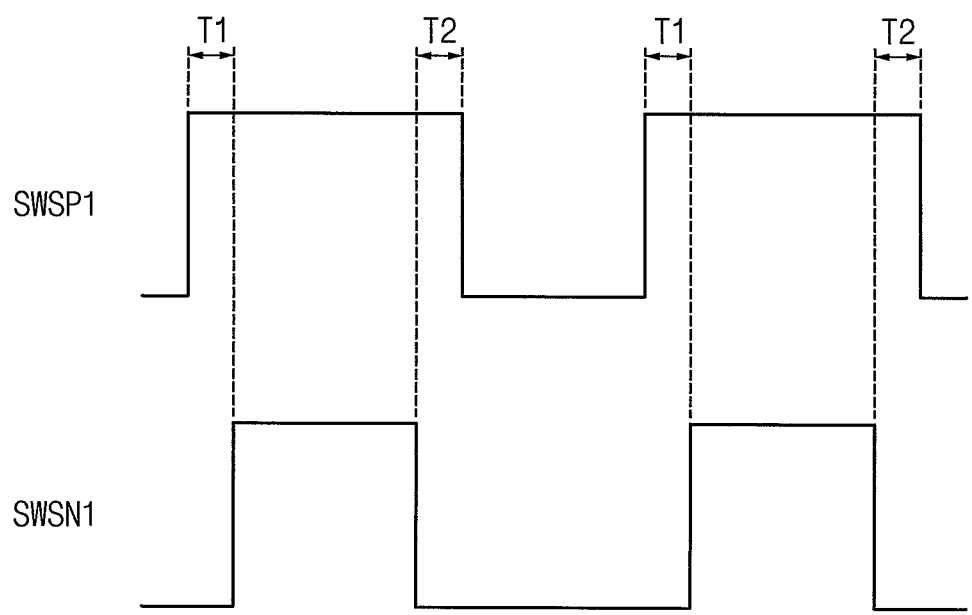
FIG. 9 is a timing diagram of switching signals in a transmitting block of FIG. 5 according to an embodiment of the present disclosure.

FIG. 5 is a block diagram illustrating a transmitting block included in an NFC controller of an NFC package according to an embodiment of the present disclosure, FIG. 6 is a timing diagram illustrating switching signals in a transmitting block of FIG. 5 that performs a differential operation according to an embodiment of the present disclosure, FIG. 7 is a timing diagram of switching signals in a transmitting block of FIG. 5 that performs a double operation according to an embodiment of the present disclosure, FIG. 8A is a timing diagram of switching signals in a transmitting block of FIG. 5 that performs a single operation according to an embodiment of the present disclosure, FIG. 8B is a timing diagram of switching signals in a transmitting block of FIG. 5 that performs a single operation according to an embodiment of the present disclosure, and FIG. 9 is a timing diagram of switching signals in a transmitting block of FIG. 5 according to an embodiment of the present disclosure.

Referring to FIG. 5, a transmitting block 500 included in an NFC controller may have first and second transmitting terminals TX1 and TX2 that are connected to an NFC antenna and an MST antenna. The transmitting block 500 may drive the NFC antenna connected to the first and second transmitting terminals TX1 and TX2 to perform an NFC communication in an NFC mode, and may drive the MST antenna connected to the first and second transmitting terminals TX1 and TX2 to perform an MST communication in an MST mode.

As illustrated in FIG. 5, the transmitting block 500 may include a first driver 540 that outputs a first electrical signal to the first transmitting terminal TX1, a second driver 560 that outputs a second electrical signal to the second transmitting terminal TX2, and a gate controller 520 that controls the first and second drivers 540 and 560. For example, the gate controller 520 may generate a first switching signal SWSP1, a second switching signal SWSN1, a third switching signal SWSP2 and a fourth switching signal SWSN2 to control the first and second drivers 540 and 560. The first driver 540 may include a first PMOS transistor P1 that selectively connects the first transmitting terminal TX1 to a first power supply voltage VDD in response to the first switching signal SWSP1, and a first NMOS transistor N1 that selectively connects the first transmitting terminal TX1 to a second power supply voltage VSS in response to the second switching signal SWSN1. The second driver 560 may include a second PMOS transistor P2 that selectively connects the second transmitting terminal TX2 to the first power supply voltage VDD in response to the third switching signal SWSP2, and a second NMOS transistor N1 that selectively connects the second transmitting terminal TX2 to the second power supply voltage VSS in response to the fourth switching signal SWSN2.

The gate controller 520 may operate the first and second driver 540 and 560 with a first operating frequency (e.g., approximately 13.56 MHz) in the NFC mode, and may operate the first and second driver 540 and 560 with a second operating frequency (e.g., lower than approximately 15 kHz) lower than the first operating frequency in the MST mode. For example, in the NFC mode, the gate controller 520 may generate the first and second switching signals SWSP1 and SWSN1 such that the first PMOS transistor P1 or the first NMOS transistor N1 is selectively turned on with the first operating frequency, and may generate the third and fourth switching signals SWSP2 and SWSN2 such that the second PMOS transistor P2 or the second NMOS transistor N2 is selectively turned on with the first operating frequency. In the MST mode, the gate controller 520 may generate the first and second switching signals SWSP1 and SWSN1 such that the first PMOS transistor P1 or the first NMOS transistor N1 is selectively turned on with the second operating frequency lower than the first operating frequency, and may generate the third and fourth switching signals SWSP2 and SWSN2 such that the second PMOS transistor P2 or the second NMOS transistor N2 is selectively turned on with the second operating frequency.

In an embodiment of the present disclosure, the gate controller 520 may control the first and second drivers 540 and 560 to perform a differential operation in the NFC mode and/or the MST mode. To perform a differential operation, the gate controller 520 may control the first and second drivers 540 and 560 such that the first electrical signal from the first driver 540 at the first transmitting terminal TX1 and the second electrical signal from the second driver 560 at the second transmitting terminal TX2 have opposite phases. For example, as illustrated in FIG. 6, the gate controller 520 may apply the first and second switching signals SWSP1 and SWSN1 having high levels to the first driver 540 and the third and fourth switching signals SWSP2 and SWSN2 having low levels to the second driver 560, or may apply the first and second switching signals SWSP1 and SWSN1 having low levels to the first driver 540 and the third and fourth switching signals SWSP2 and SWSN2 having high levels to the second driver 560. In an embodiment of the present disclosure, each of the first through fourth switching signals SWSP1, SWSN1, SWSP2 and SWSN2 may be toggled with the first operating frequency (e.g., approximately 13.56 MHz) in the NFC mode, and may be toggled with the second operating frequency (e.g., lower than approximately 15 kHz) in the MST mode. In an embodiment of the present disclosure, the gate controller 520 may control the first and second drivers 540 and 560 to perform a differential operation in both of the NFC mode and the MST mode, but is not limited thereto.

In an embodiment of the present disclosure, the gate controller 520 may control the first and second drivers 540 and 560 to perform a double operation in the NFC mode and/or the MST mode. To perform a double operation, the gate controller 520 may control the first and second drivers 540 and 560 such that the first electrical signal from the first driver 540 at the first transmitting terminal TX1 and the second electrical signal from the second driver 560 at the second transmitting terminal TX2 have the same phase. For example, as illustrated in FIG. 7, the gate controller 520 may apply the first through fourth switching signals SWSP1, SWSN1, SWSP2 and SWSN2 having the same high level or the same low level to the first and second drivers 540 and 560. In an embodiment of the present disclosure, the gate controller 520 may control the first and second drivers 540 and 560 to perform the differential operation in the NFC mode and to perform the double operation in the MST mode, but is not limited thereto.

In an embodiment of the present disclosure, the gate controller 520 may control the first and second drivers 540 and 560 to perform a single operation in the NFC mode and/or the MST mode. To perform a single operation, the gate controller 520 may activate one of the first and second drivers 540 and 560, and may deactivate the other of the first and second drivers 540 and 560. For example, as illustrated in FIG. 8A, the gate controller 520 may activate the first driver 540 by applying the first and second switching signals SWSP1 and SWSN1 that toggle to the high level or the low level to the first driver 540, and may allow the second terminal TX2 to be grounded by applying the third and fourth switching signals SWSP2 and SWSN2 having the high level to the second driver 560. In an embodiment of the present disclosure, as illustrated in FIG. 8B, the gate controller 520 may activate the first driver 540 by applying the first and second switching signals SWSP1 and SWSN1 that toggle to the high level or the low level to the first driver 540, and may allow the second terminal TX2 to be floated by applying the third switching signal SWSP2 having the high level and the fourth switching signal SWSN2 having the low level to the second driver 560. In an embodiment of the present disclosure, the gate controller 520 may control the first and second drivers 540 and 560 to perform the differential operation in the NFC mode and to perform the single operation in the MST mode, but is not limited thereto.

In an embodiment of the present disclosure, the gate controller 520 may generate the first and second switching signals SWSP1 and SWSN1 such that the first PMOS transistor P1 and the first NMOS transistor N1 are not simultaneously turned on at any point in time, and may generate the third and fourth switching signals SWSP2 and SWSN2 such that the second PMOS transistor P2 and the second NMOS transistor N2 are not simultaneously turned on at any point in time. To prevent the first PMOS and first NMOS transistors P1 and N1 from being turned on simultaneously, the gate controller 520 may generate the first and second switching signals SWSP1 and SWSN1 such that a low level period of the first switching signal SWSP1 does not overlap a high level period of the second switching signal SWSN1. Further, to prevent the second PMOS and second NMOS transistors P2 and N2 from being turned on simultaneously, the gate controller 520 may generate the third and fourth switching signals SWSP2 and SWSN2 such that a low level period of the third switching signal SWSP2 does not overlap a high level period of the fourth switching signal SWSN2. For example, as illustrated in FIG. 9, after a first predetermined time T1 lapses from the last point in time when the first switching signal SWSP1 is at the low level (or the third switching signal SWSP2), the high level period of the second switching signal SWSN1 (or the fourth switching signal SWSN2) may begin. Further, after a second predetermined time T2 lapses from the last point in time of the high level period of the second switching signal SWSN1 (or the fourth switching signal SWSN2), the low level period of the first switching signal SWSP1 (or the third switching signal SWSP2) may begin. Accordingly, the first PMOS and the first NMOS transistors P1 and N1 (or the second PMOS and the second NMOS transistors P2 and N2) are prevented from simultaneously being turned on at any point in time.

As described above, in the NFC package according to an embodiment of the present disclosure, the transmitting block 500 may perform not only an NFC communication by driving the NFC antenna connected to the first and second transmitting terminals TX1 and TX2 in the NFC mode, but also an MST communication by driving the MST antenna connected to the first and second transmitting terminals TX1 and TX2 in the MST mode. Further, since the transmitting block 500 may perform an MST communication, a dedicated chip for MST communication is not required, which results in the reduction of cost and size.

Figure 10:
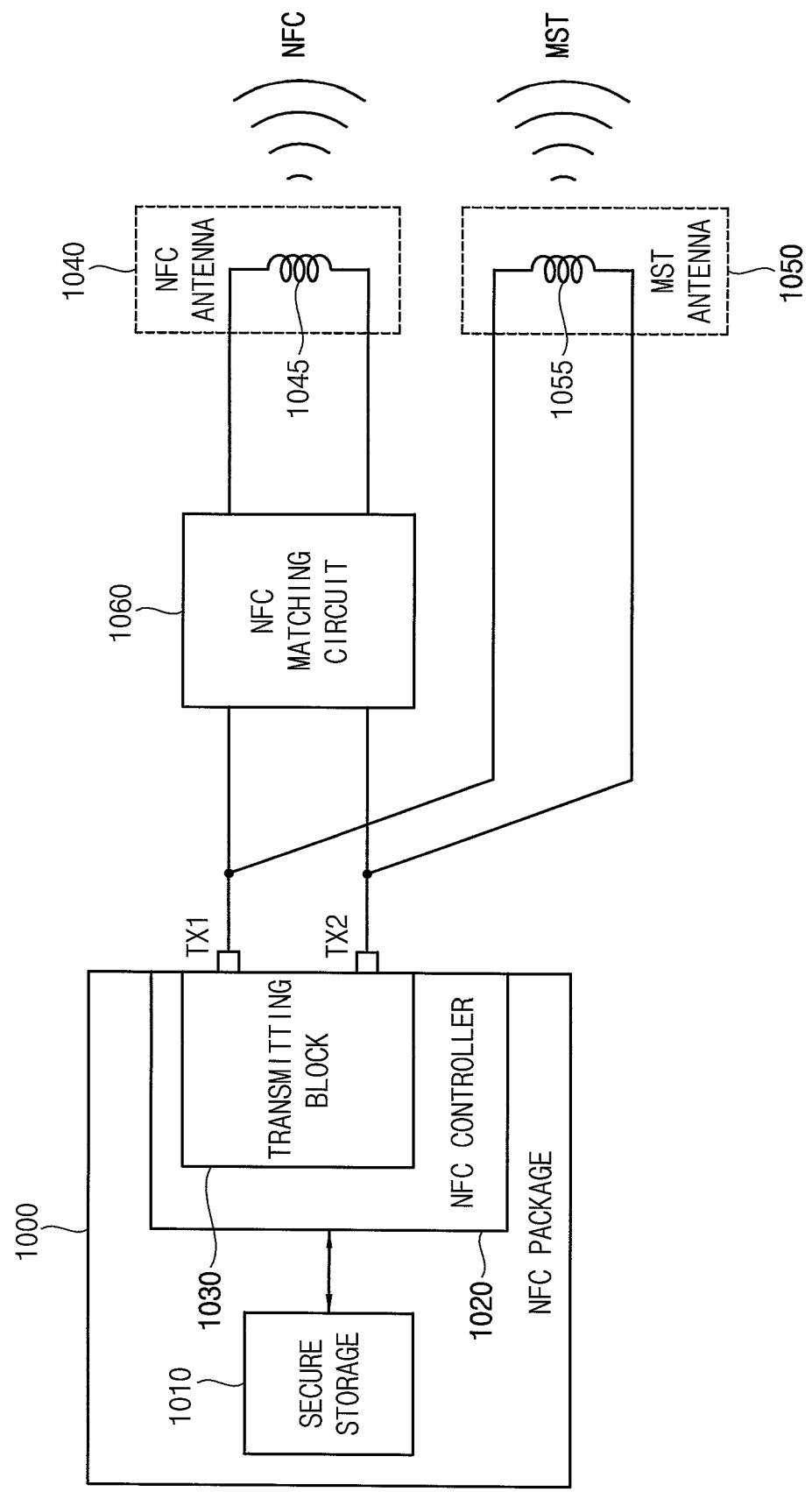
FIG. 10 is a block diagram of a connection relationship between an NFC package and NFC and MST antennas according to an embodiment of the present disclosure.
Figure 11A:
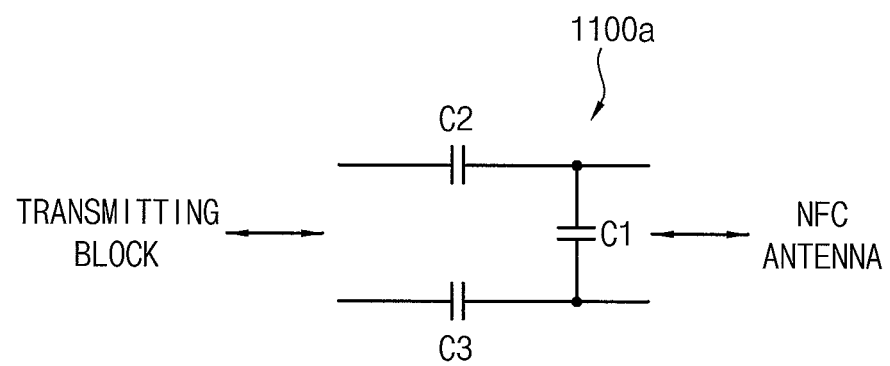
FIG. 11A is a circuit diagram of a first impedance matching circuit connected between a transmitting block included in an NFC controller of an NFC package and an NFC antenna according to an embodiment of the present disclosure.
Figure 11B:
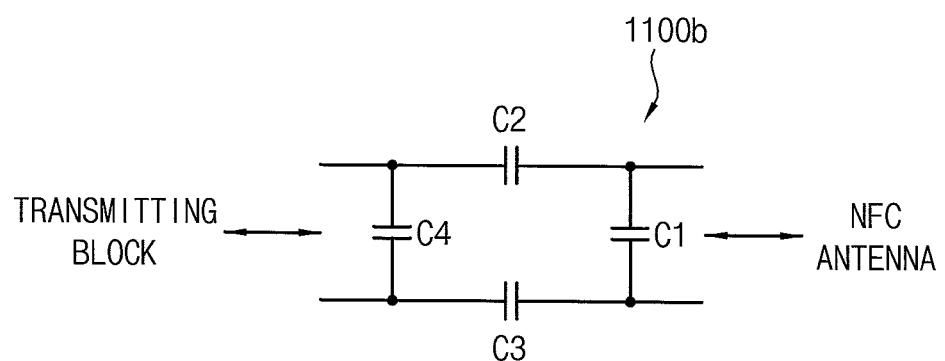
FIG. 11B is a circuit diagram of a first impedance matching circuit connected between a transmitting block included in an NFC controller of an NFC package and an NFC antenna according to an embodiment of the present disclosure.
Figure 11C:
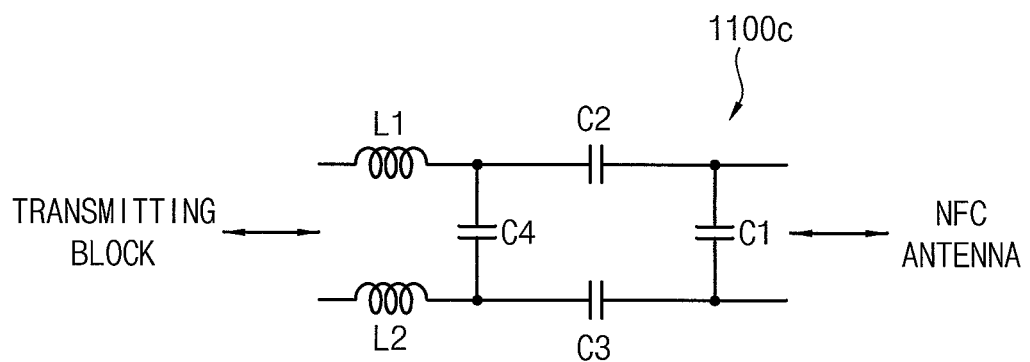
FIG. 11C is a circuit diagram of a first impedance matching circuit connected between a transmitting block included in an NFC controller of an NFC package and an NFC antenna according to an embodiment of the present disclosure.
Figure 12A:
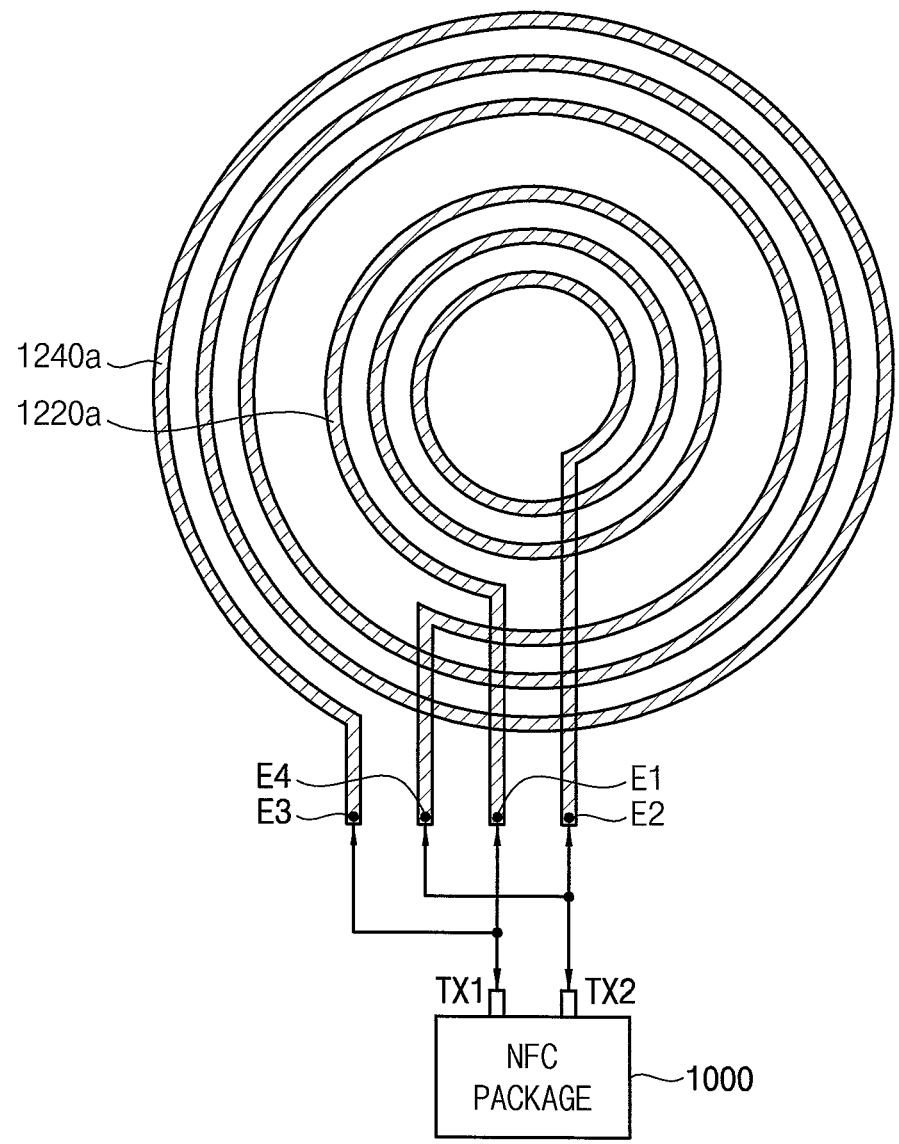
FIG. 12A is a diagram of a first loop coil included in an NFC antenna and a second loop coil included in an MST antenna according to an embodiment of the present disclosure.
Figure 12B:
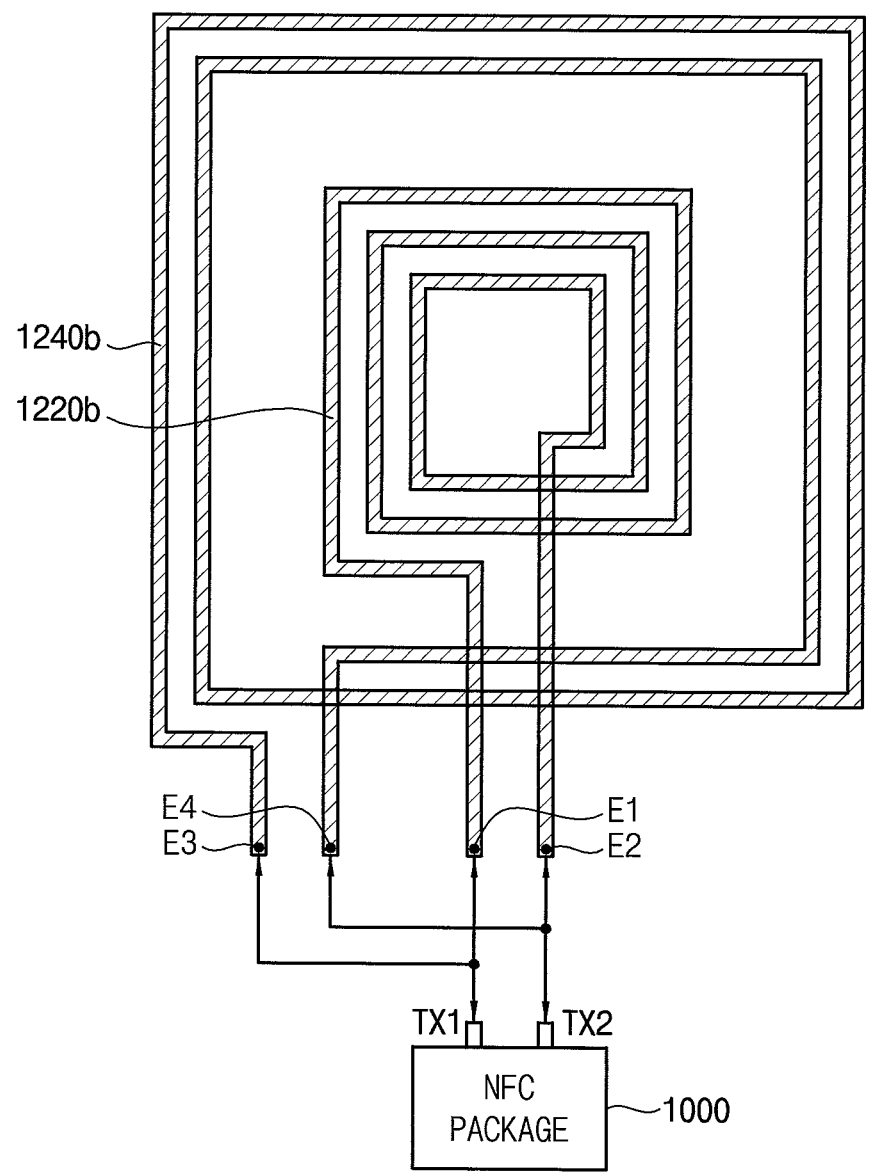
FIG. 12B is a diagram of a first loop coil included in an NFC antenna and a second loop coil included in an MST antenna according to an embodiment of the present disclosure.
Figure 13:
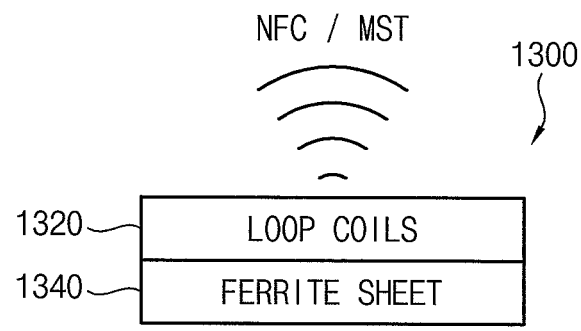
FIG. 13 is a diagram of NFC and MST antennas including a magnetic sheet according to an embodiment of the present disclosure.
Figure 14A:
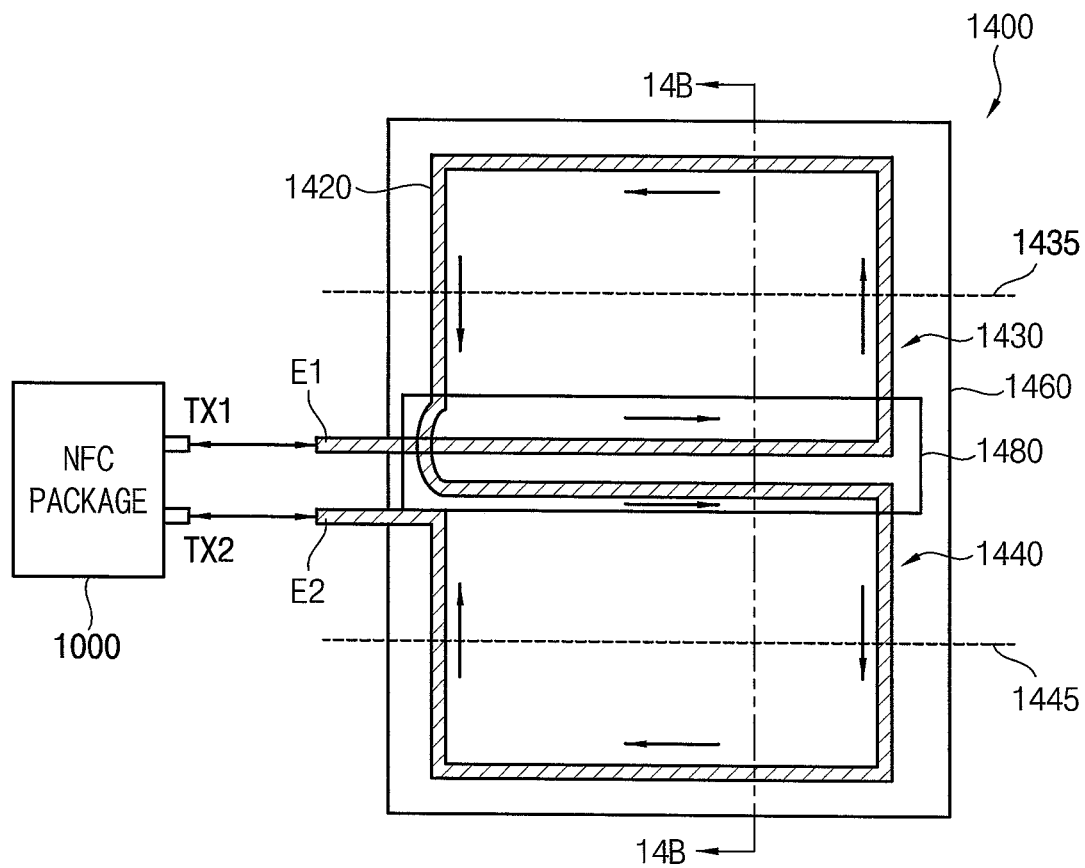
FIG. 14A is a diagram of an MST antenna (or an NFC antenna) according to an embodiment of the present disclosure.
Figure 14B:
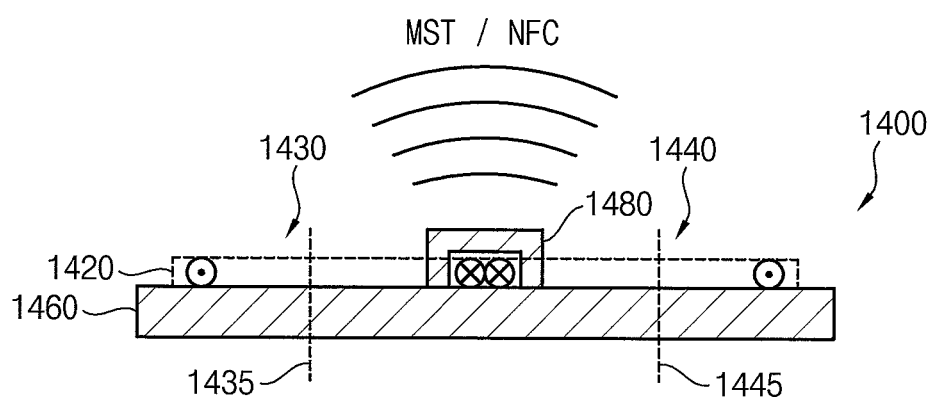
FIG. 14B is a cross-sectional view of an MST antenna (or an NFC antenna) taken along line 14B-14B of FIG. 14A according to an embodiment of the present disclosure.

FIG. 10 is a block diagram of a connection relationship between an NFC package and NFC and MST antennas according to an embodiment of the present disclosure, FIG. 11A is a circuit diagram of a first impedance matching circuit connected between a transmitting block included in an NFC controller of an NFC package and an NFC antenna according to an embodiment of the present disclosure, FIG. 11B is a circuit diagram of a first impedance matching circuit connected between a transmitting block included in an NFC controller of an NFC package and an NFC antenna according to an embodiment of the present disclosure, FIG. 11C is a circuit diagram of a first impedance matching circuit connected between a transmitting block included in an NFC controller of an NFC package and an NFC antenna according to an embodiment of the present disclosure, FIG. 12A is a diagram of a first loop coil included in an NFC antenna and a second loop coil included in an MST antenna according to an embodiment of the present disclosure, FIG. 12B is a diagram of a first loop coil included in an NFC antenna and a second loop coil included in an MST antenna according to an embodiment of the present disclosure, FIG. 13 is a diagram of NFC and MST antennas 1300 including a magnetic sheet according to an embodiment of the present disclosure, FIG. 14A is a diagram of an MST antenna (or an NFC antenna) according to an embodiment of the present disclosure, and FIG. 14B is a cross-sectional view of an MST antenna (or an NFC antenna) taken along line 14B-14B of FIG. 14A according to an embodiment of the present disclosure.

Referring to FIG. 10, an NFC package 1000 according to an embodiment of the present disclosure may include a secure storage device 1010 that stores data, such as payment data, and an NFC controller 1020 that receives data from the secure storage device 1010. The NFC controller 1020 may include a transmitting block 1030 having a first transmitting terminal TX1 and a second transmitting terminal TX2. The first and second transmitting terminals TX1 and TX2 may be connected to an NFC antenna 1040 and an MST antenna 1050. The transmitting block 1030 may perform an NFC communication by driving the NFC antenna 1040 connected to the first and second transmitting terminals TX1 and TX2 in an NFC mode, and may perform an MST communication by driving the MST antenna 1050 connected to the first and second transmitting terminals TX1 and TX2 in an MST mode.

In an embodiment of the present disclosure, the NFC antenna 1040 may include a first loop coil 1045, and the MST antenna 1050 may include a second loop coil 1055. The first and second transmitting terminals TX1 and TX2 of the transmitting block 1030 may be connected to the first loop coil 1045 of the NFC antenna 1040 via a first impedance matching circuit 1060 (e.g., an NFC impedance matching circuit), and may be directly connected to the second loop coil 1055 of the MST antenna 1050.

The first impedance matching circuit 1060 may perform impedance matching between the transmitting block 1030 and the NFC antenna 1040. In an embodiment of the present disclosure, as illustrated in FIG. 11A, a first impedance matching circuit 1100a may include a first capacitor C1 connected between a first end and a second end of the first loop coil 1045, a second capacitor C2 connected between the first end of the first loop coil 1045 and the first transmitting terminal TX1 of the transmitting block 1030, and a third capacitor C3 connected between the second end of the first loop coil 1045 and the second transmitting terminal TX2 of the transmitting block 1030. The first capacitor C1 may have a predetermined capacitance to allow the first loop coil 1045 to have a certain resonance frequency (e.g., approximately 13.56 MHz). In an embodiment of the present disclosure, as compared to the first impedance matching circuit 1100*a* of FIG. 11A, a first impedance matching circuit 1100*b* illustrated in FIG. 11B may further include a fourth capacitor C4 having a first electrode connected to a first node between the first transmitting terminal TX1 of the transmitting block 1030 and the second capacitor C2 and a second electrode connected to a second node between the second transmitting terminal TX2 of the transmitting block 1030 and the third capacitor C3. In an embodiment of the present disclosure, as compared to the first impedance matching circuit 1100*b* of FIG. 11B, a first impedance matching circuit 1100*c* illustrated in FIG. 11C may further include a first inductor L1 connected between the first transmitting terminal TX1 of the transmitting block 1030 and the first node, and a second inductor L2 connected between the second transmitting terminal TX2 of the transmitting block 1030 and the second node. In an embodiment of the present disclosure, the fourth capacitor C4 illustrated in FIG. 11B, or the first inductor L1, the second inductor L2 and the fourth capacitor C4 illustrated in FIG. 11C may serve as an electro-magnetic compatibility (EMC) filter. Although FIGS. 11A through 11C illustrate examples of the first impedance matching circuit 1100*a*, 1100*b* and 1100*c* between the transmitting block 1030 and the NFC antenna 1040, the first impedance matching circuit 1060 may not be limited thereto, and may have various configurations according to an embodiment of the present disclosure.

The first loop coil 1045 of the NFC antenna 1040 and the second loop coil 1055 of the MST antenna 1050 may have various shapes according to an embodiment of the present disclosure. According to an embodiment of the present disclosure, each of the first and second loop coils 1045 and 1055 may have any shape, such as a circular shape as illustrated in FIG. 12A, a rectangular shape as illustrated in FIG. 12B, a polygonal shape having five or more sides, an elliptical shape, or the like. Further, according to an embodiment of the present disclosure, the first and second loop coils 1045 and 1055 may have substantially the same shape, or may have different shapes from each other.

In an embodiment of the present disclosure, the first loop coil 1045 of the NFC antenna 1040 and the second loop coil 1055 of the MST antenna 1050 may be located in the same layer. In this case, the first and second loop coils 1045 and 1055 may be disposed such that one of the first and second loop coils 1045 and 1055 surrounds the other of the first and second loop coils 1045 and 1055.

For example, as illustrated in FIG. 12A, the first and second loop coils 1045 and 1055 may have circular shapes, and an outer loop coil 1240*a* of the first and second loop coils 1045 and 1055 may surround an inner loop coil 1220*a* of the first and second loop coils 1045 and 1055. For example, the inner loop coil 1220*a* may be the first loop coil 1045 of the NFC antenna 1040, and the first and second transmitting terminals TX1 and TX2 may be connected to first and second ends E1 and E2, respectively, of the inner loop coil 1220*a* via the first impedance matching circuit 1060. Further, the outer loop coil 1240*a* may be the second loop coil 1055 of the MST antenna 1050, and the first and second transmitting terminals TX1 and TX2 may be, respectively, directly connected to third and fourth ends E3 and E4 of the outer loop coil 1240*a*. In an embodiment of the present disclosure, the inner loop coil 1220*a* may be the second loop coil 1055 of the MST antenna 1050, and the outer loop coil 1240*a* may be the first loop coil 1045 of the NFC antenna 1040. In this case, the first and second transmitting terminals TX1 and TX2 of the NFC package 1000 may be, respectively, directly connected to the first and second ends E1 and E2 of the inner loop coil 1220*a*, and may be, respectively, connected to the third and fourth ends E3 and E4 of the outer loop coil 1240*a* via the first impedance matching circuit 1060.

In an embodiment of the present disclosure, as illustrated in FIG. 12B, the first and second loop coils 1045 and 1055 may have rectangular shapes, and an outer loop coil 1240*b* of the first and second loop coils 1045 and 1055 may surround the inner loop coil 1220*b* of the first and second loop coils 1045 and 1055.

In an embodiment of the present disclosure, the first loop coil 1045 of the NFC antenna 1040 and the second loop coil 1055 of the MST antenna 1050 may be located in different layers. For example, the first and second loop coils 1045 and 1055 may be disposed on opposite surfaces of a flexible printed circuit board (FPCB) (or a film), or may be disposed on different FPCBs (or films).

In an embodiment of the present disclosure, a magnetic sheet may be disposed under the first loop coil 1045 and/or the second loop coil 1055. For example, as illustrated in FIG. 13, a magnetic sheet 1340 may be disposed under a lower surface (e.g. opposite to an upper surface through which a magnetic field is radiated to perform an NFC communication and/or an MST communication) of loop coils 1320. The magnetic sheet 1340 may improve magnetic field radiation efficiency of the loop coils 1320 by preventing the magnetic field for an NFC communication and/or an MST communication from being reduced by an eddy current caused by a change of the magnetic field at a component under the loop coils 1320. For example, the magnetic sheet 1340 may be a ferrite sheet or a magneto-dielectric material (MDM) sheet.

In an embodiment of the present disclosure, the second loop coil 1055 of the MST antenna 1050 (or the first loop coil 1045 of the NFC antenna 1040) may have a structure having a first loop for forming a current path in a counter-clockwise direction (or a clockwise direction), and a second loop for forming a current path in a clockwise direction (or a counterclockwise direction). The first and second loops may be adjacent to each other such that one side of the first loop and one side of the second loop are in close proximity to each other. For example, as illustrated in FIGS. 14A and 14B, an MST antenna 1400 may include a first magnetic sheet 1460, and a second loop coil 1420 disposed on the first magnetic sheet 1460. The second loop coil 1420 may have a structure or shape such as a figure-8, having a first loop 1430 that forms a current path in a counterclockwise direction, and a second loop 1440 that is adjacent to the first loop 1430 and forms a current path in an opposite direction to that of the first loop 1430, or a clockwise direction. The first and second transmitting terminals TX1 and TX2 of the NFC package 1000 may be, respectively, directly connected to first and second ends E1 and E2 of the second loop coil 1420. The MST antenna 1400 may further include a second magnetic sheet 1480 disposed over a region where one side of the first loop 1430 and one side of the second loop 1440 are located in close proximity to each other. In a case where the second magnetic sheet 1480 is not present, a magnetic field may be canceled out at a region near a center line 1435 of the first loop 1430 and at a region near a center line 1445 of the second loop 1440. However, if the second magnetic sheet 1480 is disposed over the region (between the center lines 1435 and 1445) where the adjacent sides of the first and second loops 1430 and 1440 are located, the second magnetic sheet 1480 may prevent this canceling near the center lines 1435 and 1445. In an embodiment of the present disclosure, the first loop coil 1045 of the NFC antenna 1040 may also have a figure-8 shaped structure as illustrated in FIGS. 14A and 14B.

As described above, the NFC package 1000 according to an embodiment of the present disclosure may include the transmitting block 1030 connected to the first loop coil 1045 of the NFC antenna 1040 via the first impedance matching circuit 1060 and directly connected to the second loop coil 1055 of the MST antenna 1050. In the NFC package 1000 according to an embodiment of the present disclosure, the transmitting block 1030 may perform an NFC communication using the first loop coil 1045 of the NFC antenna 1040 in the NFC mode, and may further perform an MST communication using the second loop coil 1055 of the MST antenna 1050. Accordingly, since an MST communication is performed by the transmitting block 1030 of the NFC package 1000, a dedicated chip for MST communication is not required, which results in the reduction of cost and size.

Figure 15:
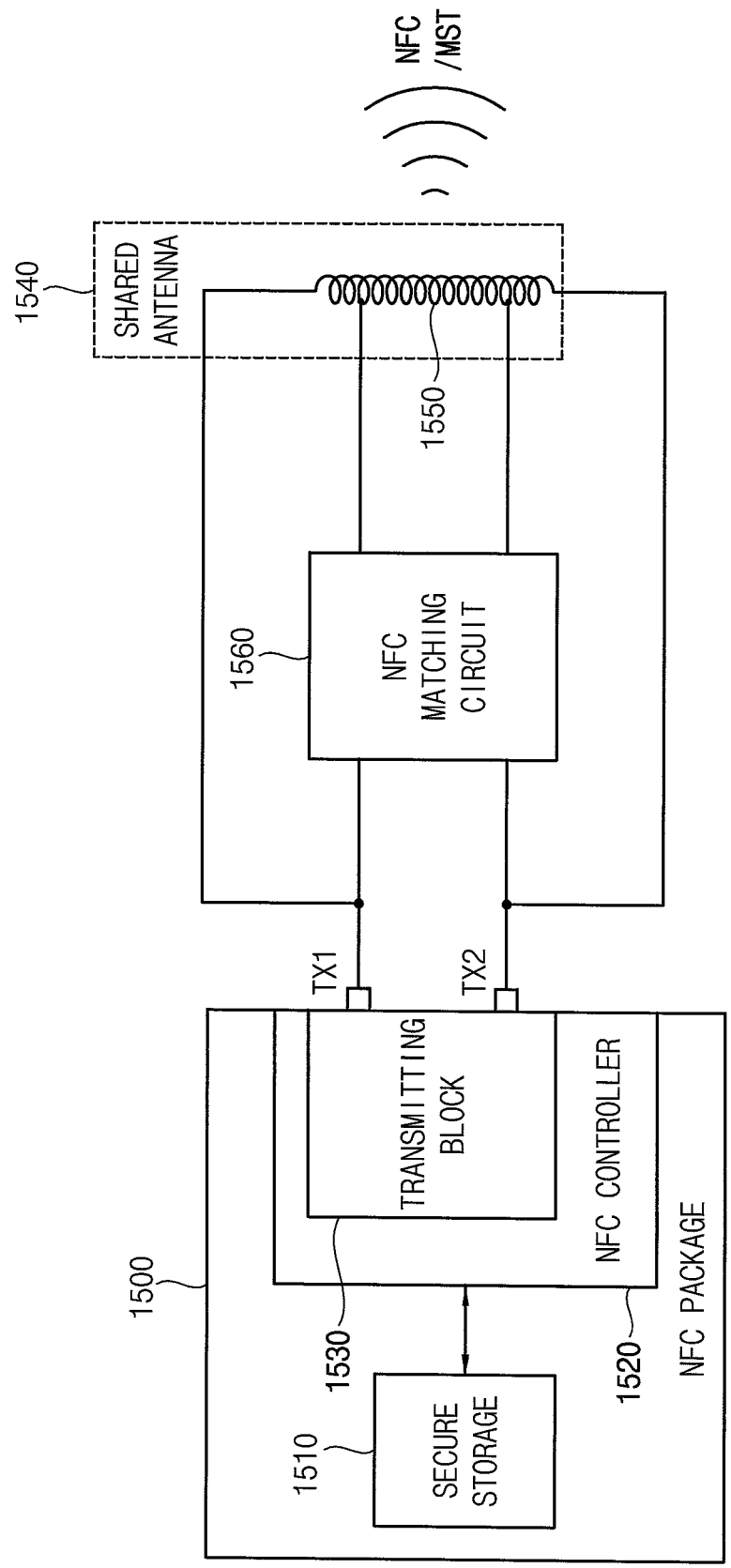
FIG. 15 is a block diagram of a connection relationship between an NFC package and a shared antenna according to an embodiment of the present disclosure.
Figure 16:
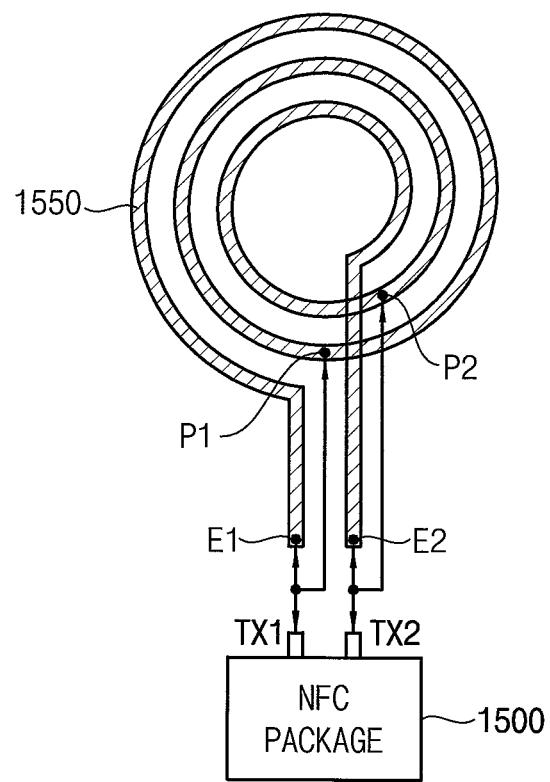
FIG. 16 is a diagram of a connection relationship between an NFC package and a shared loop coil included in a shared antenna according to an embodiment of the present disclosure.

FIG. 15 is a block diagram of a connection relationship between an NFC package and a shared antenna according to an embodiment of the present disclosure, and FIG. 16 is a diagram of a connection relationship between an NFC package and a shared loop coil included in a shared antenna according to an embodiment of the present disclosure.

Referring to FIG. 15, an NFC package 1500 according to an embodiment of the present disclosure may include a secure storage device 1510 and an NFC controller 1520. The NFC controller 1520 may include a transmitting block 1530 having a first transmitting terminal TX1 and a second transmitting terminal TX2. The first and second transmitting terminals TX1 and TX2 may be connected to a shared antenna 1540. The transmitting block 1530 may perform an NFC communication using at least a portion of the shared antenna 1540 in an NFC mode, and may further perform an MST communication using at least a portion of the shared antenna 1540.

The shared antenna 1540 may include a shared loop coil 1550. In an embodiment of the present disclosure, the first and second transmitting terminals TX1 and TX2 of the transmitting block 1530 may be directly connected to first and second ends of the shared loop coil 1550, and may be further connected to ends of at least part of the shared loop coil 1550 via a first impedance matching circuit 1560 (e.g., an NFC impedance matching circuit).

For example, as illustrated in FIG. 16, the first and second terminals TX1 and TX2 of the NFC package 1500 may be, respectively, directly connected to the first and second ends E1 and E2 of the shared loop coil 1550. The transmitting block 1530 may perform an MST communication using the entire path of the shared loop coil 1550 as an MST antenna in an MST mode. The first and second terminals TX1 and TX2 of the NFC package 1500 may be further connected to two pre-determined points P1 and P2 on the path between the first and second ends E1 and E2 of the shared loop coil 155 via the first impedance matching circuit 1560. The transmitting block 1530 may perform an NFC communication using a part of the shared loop coil 1550, or a path between the two points P1 and P2 of the shared loop coil 1550 as an NFC antenna in an MST mode. Typically, an intensity of a magnetic field for an MST communication may be greater than an intensity of a magnetic field for an NFC communication. In the example illustrated in FIG. 16, since the entire path of the shared loop coil 1550 is used as the MST antenna, the MST antenna for an MST communication may have a certain inductance, and thus the magnetic field radiated by the MST antenna may have a certain intensity.

In an embodiment of the present disclosure, the first and second terminals TX1 and TX2 may be directly connected to the ends of the shared loop coil 1550 to perform an MST communication using the entire path of the shared loop coil 1550 as the MST antenna, and may be further connected to the ends of the shared loop coil 1550 via the first impedance matching circuit 1560 to perform an NFC communication also using the entire path of the shared loop coil 1550 as the NFC antenna.

Figure 17:
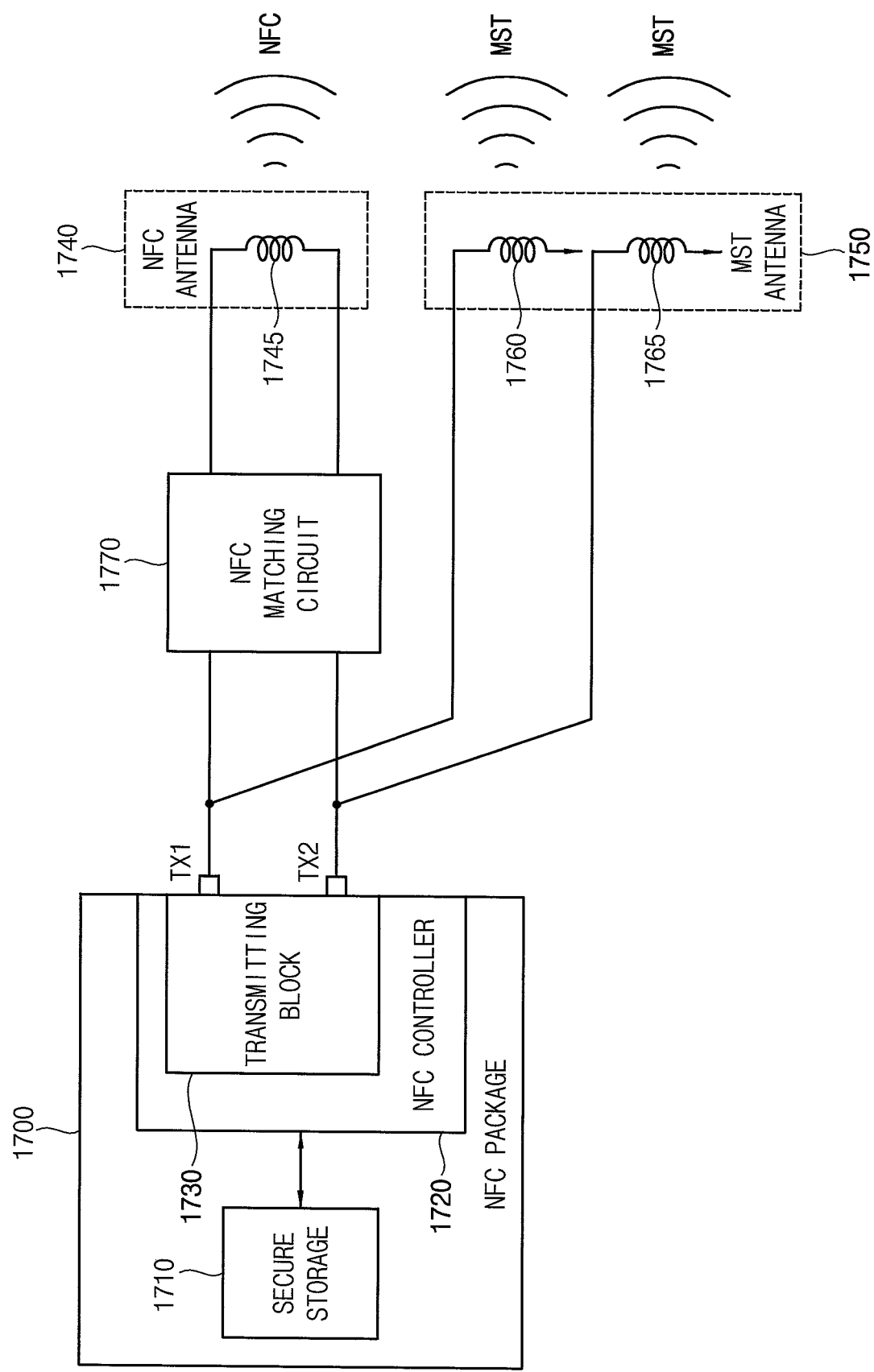
FIG. 17 is a block diagram of a connection relationship between an NFC package and NFC and MST antennas according to an embodiment of the present disclosure.
Figure 18A:
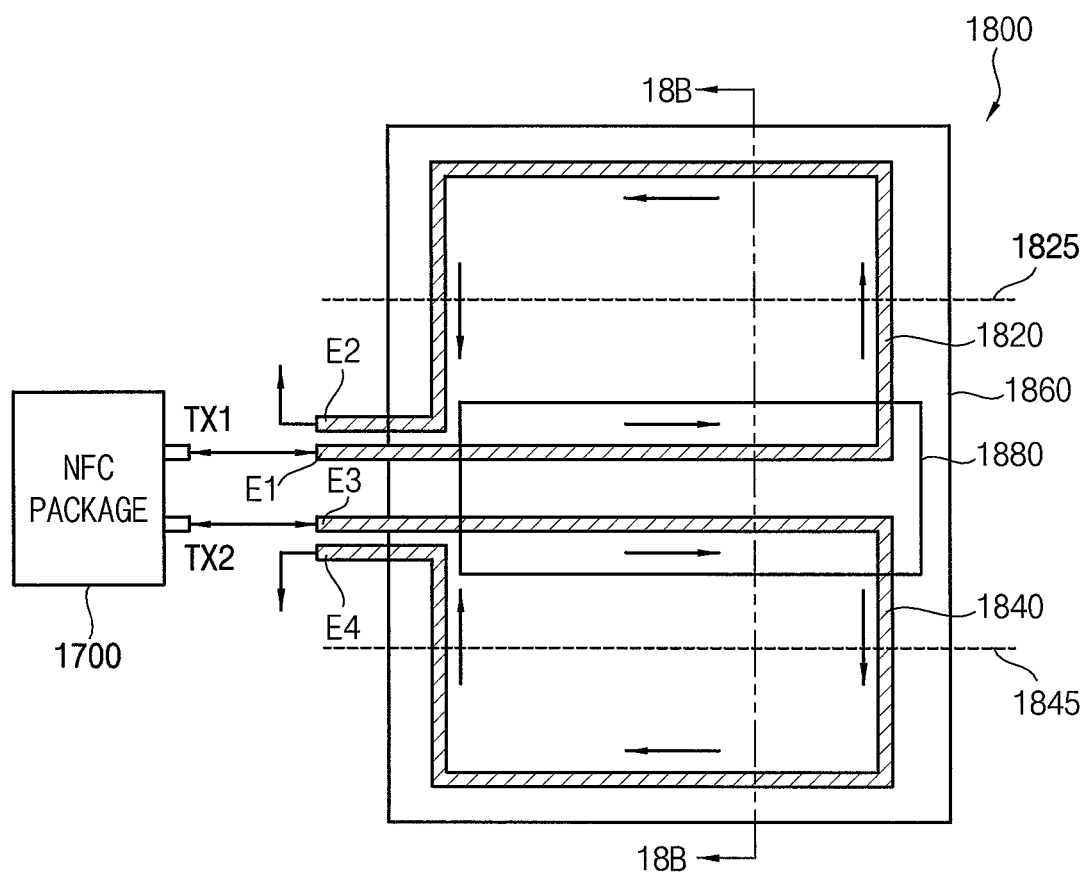
FIG. 18A is a diagram of an MST antenna of FIG. 17 according to an embodiment of the present disclosure.
Figure 18B:
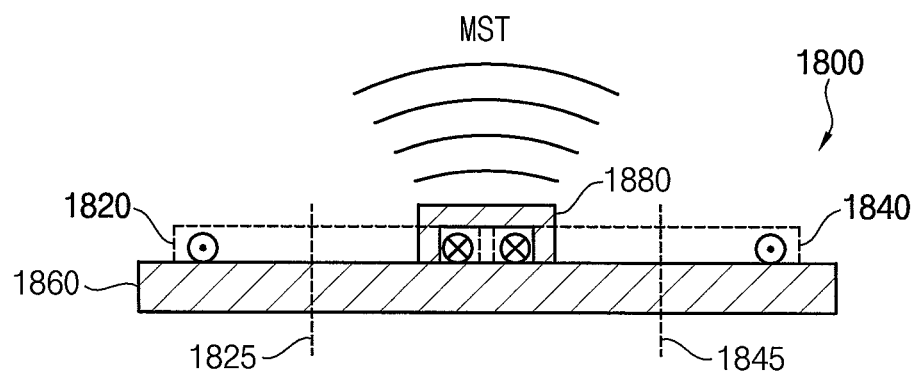
FIG. 18B is a cross-sectional view of an MST antenna taken along line 18B-18B of FIG. 18A according to an embodiment of the present disclosure.

FIG. 17 is a block diagram of a connection relationship between an NFC package and NFC and MST antennas according to an embodiment of the present disclosure, FIG. 18A is a diagram of an MST antenna of FIG. 17 according to an embodiment of the present disclosure, and FIG. 18B is a cross-sectional view of an MST antenna taken along line 18B-18B of FIG. 18A according to an embodiment of the present disclosure.

Referring to FIG. 17, an NFC package 1700 according to an embodiment of the present disclosure may include a secure storage device 1710 and an NFC controller 1720. The NFC controller 1720 may include a transmitting block 1730 having a first transmitting terminal TX1 and a second transmitting terminal TX2. The first and second transmitting terminals TX1 and TX2 may be connected to an NFC antenna 1740 and an MST antenna 1750. The transmitting block 1730 may perform an NFC communication by driving the NFC antenna 1740 in an NFC mode, and may perform an MST communication by driving the MST antenna 1750 in an MST mode.

The NFC antenna 1740 may include a first loop coil 1745, and the first and second transmitting terminals TX1 and TX2 of the transmitting block 1730 may be connected to both ends of the first loop coil 1745 of the NFC antenna 1740 via a first impedance matching circuit 1770 (e.g., an NFC impedance matching circuit). The transmitting block 1730 may perform an NFC communication using the first loop coil 1745 in the NFC mode.

The MST antenna 1750 may include a second loop coil 1760 of which one end is grounded, and a third loop coil 1765 of which one end is grounded. The first transmitting terminal TX1 of the transmitting block 1730 may be directly connected to the second loop coil 1760 of the MST antenna 1750, and the second transmitting terminal TX2 of the transmitting block 1730 may be directly connected to the third loop coil 1765 of the MST antenna 1750. In an embodiment of the present disclosure, the transmitting block 1730 may perform a double operation described above with reference to FIG. 7 in the MST mode, and the MST antenna 1750 may have a structure as illustrated in FIGS. 18A and 18B that is suitable for a double operation. For example, as illustrated in FIGS. 18A and 18B, the MST antenna 1800 may include a first magnetic sheet 1860, and second and third loop coils 1820 and 1840 disposed adjacent to each other on the first magnetic sheet 1860. The second loop coil 1820 may have a first loop shape for forming a current path in a counterclockwise direction, and the third loop coil 1840 may have a second loop shape for forming a current path in a clockwise direction. The first transmitting terminal TX1 of the NFC package 1700 may be directly connected to a first end E1 of the second loop coil 1820, and a second end E2 of the second loop coil 1820 may be grounded. The second transmitting terminal TX2 of the NFC package 1700 may be directly connected to a third end E3 of the third loop coil 1840, and a fourth end E4 of the third loop coil 1840 may be grounded. The MST antenna 1800 may further include a second magnetic sheet 1880 disposed over a region where one side of the second loop coil 1820 and one side of the third loop coil 1840 are located in close proximity to each other. In a case where the second magnetic sheet 1880 is not present, a magnetic field may be canceled out at a region near a center line 1825 of the second loop coil 1820 and at a region near a center line 1845 of the third loop coil 1840. However, if the second magnetic sheet 1480 is disposed over the region (e.g. between the center lines 1825 and 1845) where the adjacent sides of the second and third loop coils 1820 and 1840 are located, the second magnetic sheet 1880 may prevent this canceling near the center lines 1825 and 1845. As described above, the transmitting block 1730 may perform an MST communication by performing a double operation as described above using both of the second and third loop coils 1820 and 1840 in the MST mode.

In an embodiment of the present disclosure, the transmitting block 1730 may perform a single operation as illustrated in FIGS. 8A and 8B in the MST mode. In this case, the transmitting block 1730 may activate one of the second and third loop coils 1820 and 1840 illustrated in FIG. 18 to perform an MST communication.

Figure 20A:
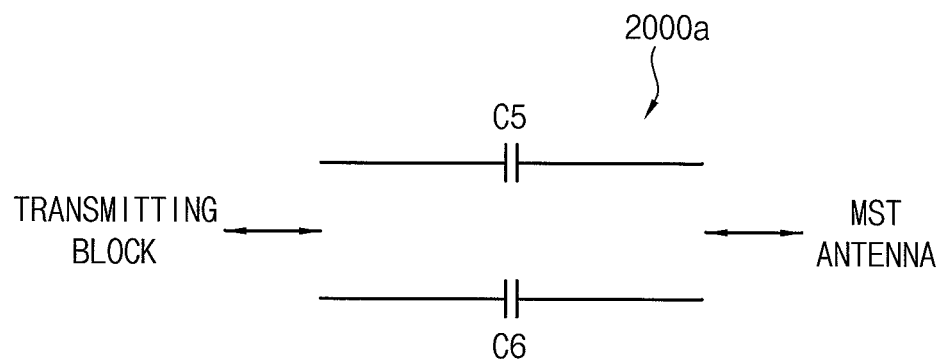
FIG. 20A is a circuit diagram of a second impedance matching circuit connected between a transmitting block included in an NFC controller of an NFC package and an MST antenna according to an embodiment of the present disclosure.
Figure 20B:
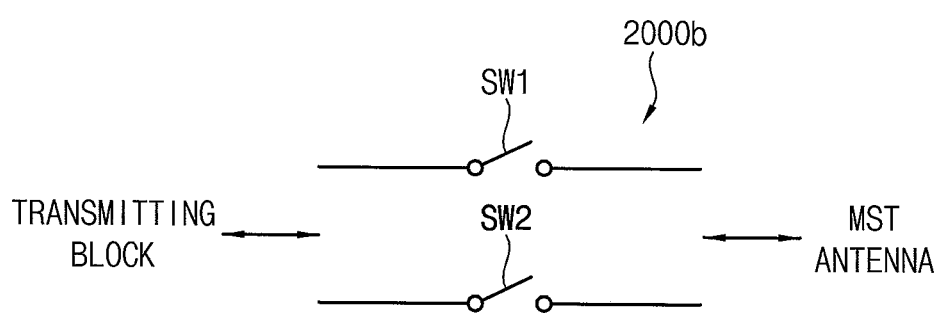
FIG. 20B is a circuit diagram of a first impedance matching circuit connected between a transmitting block included in an NFC controller of an NFC package and an MST antenna according to an embodiment of the present disclosure.

FIG. 19 is a block diagram of a connection relationship between an NFC package and NFC and MST antennas according to an embodiment of the present disclosure, FIG. 20A is a circuit diagram of a second impedance matching circuit connected between a transmitting block included in an NFC controller of an NFC package and an MST antenna according to an embodiment of the present disclosure, and FIG. 20B is a circuit diagram of a first impedance matching circuit connected between a transmitting block included in an NFC controller of an NFC package and an MST antenna according to an embodiment of the present disclosure.

Referring to FIG. 19, an NFC package 1900 according to an embodiment of the present disclosure may include a secure storage device 1910 and an NFC controller 1920. The NFC controller 1920 may include a transmitting block 1930 having a first transmitting terminal TX1 and a second transmitting terminal TX2. The first and second transmitting terminals TX1 and TX2 may be connected to an NFC antenna 1940 and an MST antenna 1950. The transmitting block 1930 may perform an NFC communication by driving the NFC antenna 1940 in an NFC mode, and may perform an MST communication by driving the MST antenna 1950 in an MST mode. In an embodiment of the present disclosure, the first and second transmitting terminals TX1 and TX2 of the transmitting block 1930 may be connected to a first loop coil 1945 of the NFC antenna 1940 via a first impedance matching circuit 1960 (e.g., an NFC impedance matching circuit), and may be further connected to a second loop coil 1955 of the MST antenna 1950 via a second impedance matching circuit 1970 (e.g., an MST impedance matching circuit). Unlike a transmitting block 1030 of FIG. 10 having transmitting terminals TX1 and TX2 that are directly connected to a second loop coil 1055 of an MST antenna 1050, the transmitting block 1930 of FIG. 19 may be connected to the second loop coil 1955 of the MST antenna 1950 via the second impedance matching circuit 1970.

The second impedance matching circuit 1970 may perform impedance matching between the transmitting block 1930 and the MST antenna 1950. In an embodiment of the present disclosure, as illustrated in FIG. 20A, a second impedance matching circuit 2000a may include a first capacitor C5 connected between a first end of the second loop coil 1955 and the first transmitting terminal TX1 of the transmitting block 1930, and a second capacitor C6 connected between a second end of the second loop coil 1955 and the second transmitting terminal TX2 of the transmitting block 1930. The first and second capacitors C5 and C6 may block an electrical signal having a frequency (e.g., an operating frequency of an NFC communication) greater than an operating frequency of an MST communication. In an embodiment of the present disclosure, as illustrated in FIG. 20B, a second impedance matching circuit 2000b may include a first switch SW1 connected between the first end of the second loop coil 1955 and the first transmitting terminal TX1 of the transmitting block 1930, and a second switch SW2 connected between the second end of the second loop coil 1955 and the second transmitting terminal TX2 of the transmitting block 1930. The first and second switches SW1 and SW2 may be open to disconnect the first and second transmitting terminals TX1 and TX2 from the MST antenna 1950 in the NFC mode, and may be closed to connect the first and second transmitting terminals TX1 and TX2 to the MST antenna 1950 in the MST mode.

In an embodiment of the present disclosure, when viewed from the first and second transmitting terminals TX1 and TX2 of the transmitting block 1930, an absolute value of an impedance Z1 of the first impedance matching circuit 1960 connected to the NFC antenna 1940 and an absolute value of an impedance Z2 of the second impedance matching circuit 1970 connected to the MST antenna 1950 may be lower at corresponding operating frequencies, respectively. That is, the absolute value of the impedance Z1 of the first impedance matching circuit 1960 connected to the NFC antenna 1940 may be relatively low at an operating frequency (e.g., approximately 13.56 MHz) for an NFC communication, and may be relatively high at an operating frequency (e.g., lower than approximately 15 kHz) for an MST communication. Further, the absolute value of the impedance Z2 of the second impedance matching circuit 1970 connected to the MST antenna 1960 may be relatively low at an operating frequency for an MST communication, and may be relatively high at an operating frequency for an NFC communication. For example, the absolute value of the impedance Z1 of the first impedance matching circuit 1960 connected to the NFC antenna 1940 may be less than approximately 50 ohms (e.g. 50Ω) at an operating frequency of approximately 13.56 MHz, and may be greater than approximately 1 MΩ at an operating frequency lower than approximately 15 kHz. Further, the absolute value of the impedance Z2 of the second impedance matching circuit 1970 connected to the MST antenna 1960 may be less than about 50Ω at an operating frequency of approximately 15 kHz, and may be greater than approximately 500Ω at an operating frequency of approximately 13.56 MHz. As described above, since the first and second impedance matching circuits 1960 and 1970 may have low absolute value impedances at corresponding operating frequencies, respectively, mode switches dedicated for switching between the NFC mode and the MST mode may not be required between the transmitting block 1930 and the NFC and MST antennas 1940 and 1950.

FIG. 21 is a block diagram of a connection relationship between an NFC package and a shared antenna according to an embodiment of the present disclosure.

Referring to FIG. 21, an NFC package 2100 according to an embodiment of the present disclosure may include a secure storage device 2110 and an NFC controller 2120. The NFC controller 2120 may include a transmitting block 2130 having a first transmitting terminal TX1 and a second transmitting terminal TX2. The first and second transmitting terminals TX1 and TX2 may be connected to a shared loop coil 2150 of a shared antenna 2140. The transmitting block 2130 may perform an NFC communication using at least a portion of the shared loop coil 2150 as an NFC antenna in an NFC mode, and may further perform an MST communication using at least a portion of the shared loop coil 2150 as an MST antenna in an MST mode. In an embodiment of the present disclosure, the first and second transmitting terminals TX1 and TX2 of the transmitting block 2130 may be connected to at least part of the shared loop coil 2150 via a first impedance matching circuit 2160, and may be further connected to first and second ends of the shared loop coil 2150 via a second impedance matching circuit 2170. Unlike the transmitting block 1530 of FIG. 15 that is directly connected to both ends of a shared loop coil 1550, the transmitting block 2130 of FIG. 21 may be connected to the ends of the shared loop coil 2150 via the second impedance matching circuit 2170. For example, the second impedance matching circuit 2170 may include capacitors and/or switches.

Figure 22:
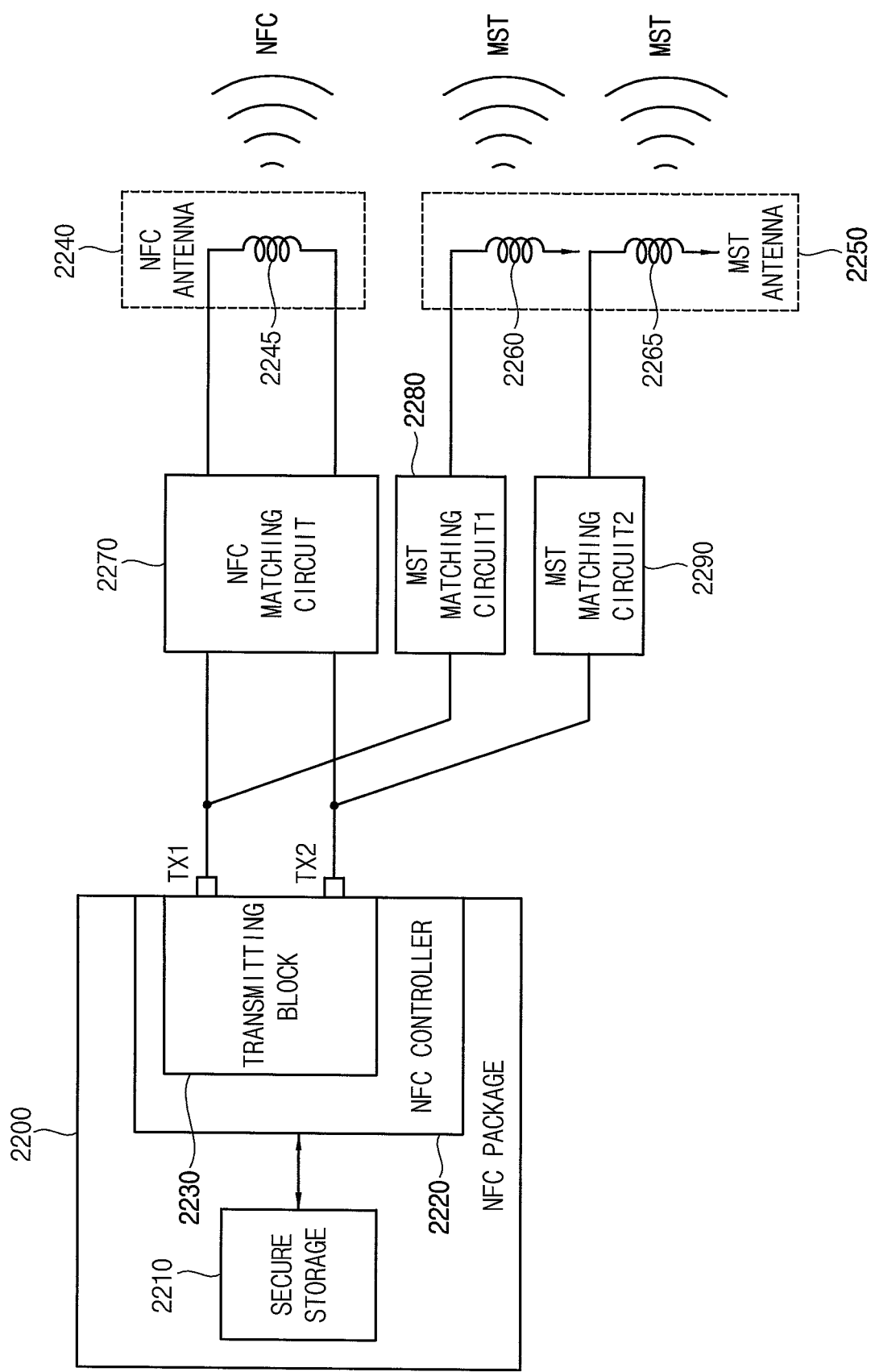
FIG. 22 is a block diagram of a connection relationship between an NFC package and NFC and MST antennas according to an embodiment of the present disclosure.

FIG. 22 is a block diagram of a connection relationship between an NFC package and NFC and MST antennas according to an embodiment of the present disclosure.

Referring to FIG. 22, an NFC package 2200 according to an embodiment of the present disclosure may include a secure storage device 2210 and an NFC controller 2220. The NFC controller 2220 may include a transmitting block 2230 having a first transmitting terminal TX1 and a second transmitting terminal TX2. The first and second transmitting terminals TX1 and TX2 may be connected to a first loop coil 2245 of an NFC antenna 2240 via a first impedance matching circuit 2270 (e.g. an NFC matching circuit). The first transmitting terminal TX1 may be further connected to a second loop coil 2260 of an MST antenna 2250 of which one end is grounded, and the second transmitting terminal TX2 may be further connected to a third loop coil 2265 of the MST antenna 2250 of which one end is grounded. The transmitting block 2230 may perform an NFC communication using the first loop coil 2245 in an NFC mode, and may further perform an MST communication using the second loop coil 2260 and/or the third loop coil 2265 in an MST mode. Unlike the transmitting block 1730 of FIG. 17 that is directly connected to loop coils 1760 and 1765 of the MST antenna 1750, the transmitting block 2230 of FIG. 22 may be connected to the loop coils 2260 and 2265 via the second and third impedance matching circuits 2280 and 2290 (e.g., a first MST matching circuit and a second MST matching circuit, respectively). For example, each of the second and third impedance matching circuits 2280 and 2290 may include at least one capacitor and/or at least one switch.

Figure 23:
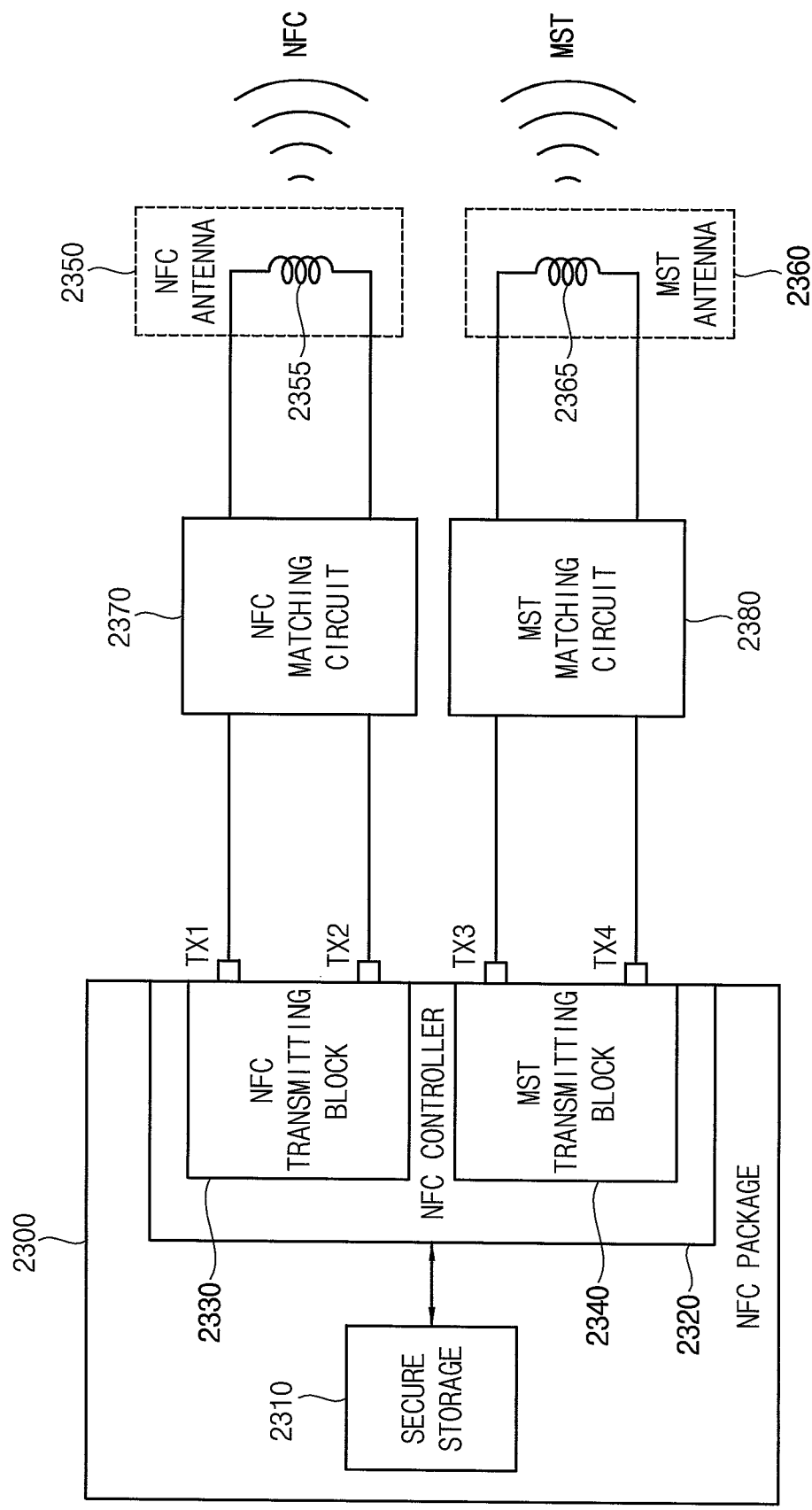
FIG. 23 is a block diagram of a connection relationship between an NFC package and NFC and MST antennas according to an embodiment of the present disclosure.

FIG. 23 is a block diagram of a connection relationship between an NFC package and NFC and MST antennas according to an embodiment of the present disclosure.

Referring to FIG. 23, an NFC package 2300 according to an embodiment of the present disclosure may include a secure storage device 2310 and an NFC controller 2320. The NFC controller 2320 may include an NFC transmitting block 2330 having first and second transmitting terminals TX1 and TX2 connected to an NFC antenna 2350, and an MST transmitting block 2340 having third and fourth transmitting terminals TX3 and TX4 connected to an MST antenna 2360.

The NFC transmitting block 2330 may perform an NFC communication by driving the NFC antenna 2350 connected to the first and second transmitting terminals TX1 and TX2 in an NFC mode. In an embodiment of the present disclosure, the NFC antenna 2350 may include a first loop coil 2355, and the first and second transmitting terminals TX1 and TX2 of the NFC transmitting block 2330 may be connected to the first loop coil 2355 of the NFC antenna 2350 via a first impedance matching circuit 2370 (e.g., an NFC impedance matching circuit). The NFC transmitting block 2330 may perform an NFC communication using the first loop coil 2355.

The MST transmitting block 2340 may perform an MST communication by driving the MST antenna 2360 connected to the third and fourth transmitting terminals TX3 and TX4 in an MST mode. In an embodiment of the present disclosure, the MST antenna 2360 may include a second loop coil 2365, and the third and fourth transmitting terminals TX3 and TX4 of the MST transmitting block 2340 may be connected to the second loop coil 2365 of the MST antenna 2360 via a second impedance matching circuit 2380 (e.g., an MST impedance matching circuit). The MST transmitting block 2340 may perform an MST communication using the second loop coil 2365.

As described above, the NFC controller 2320 of the NFC package 2300 according to an embodiment of the present disclosure may include the NFC transmitting block 2330 for an NFC communication and the MST transmitting block 2340 for an MST communication. Accordingly, the NFC package 2300 according to an embodiment of the present disclosure may perform an MST communication as well as an NFC communication, and thus may support an MST payment service through an MST communication as well as an NFC payment service through an NFC communication. Further, since an MST communication may be performed by the NFC package 2300, a dedicated chip for an MST communication is not required, which results in the reduction of cost and size.

Figure 24:
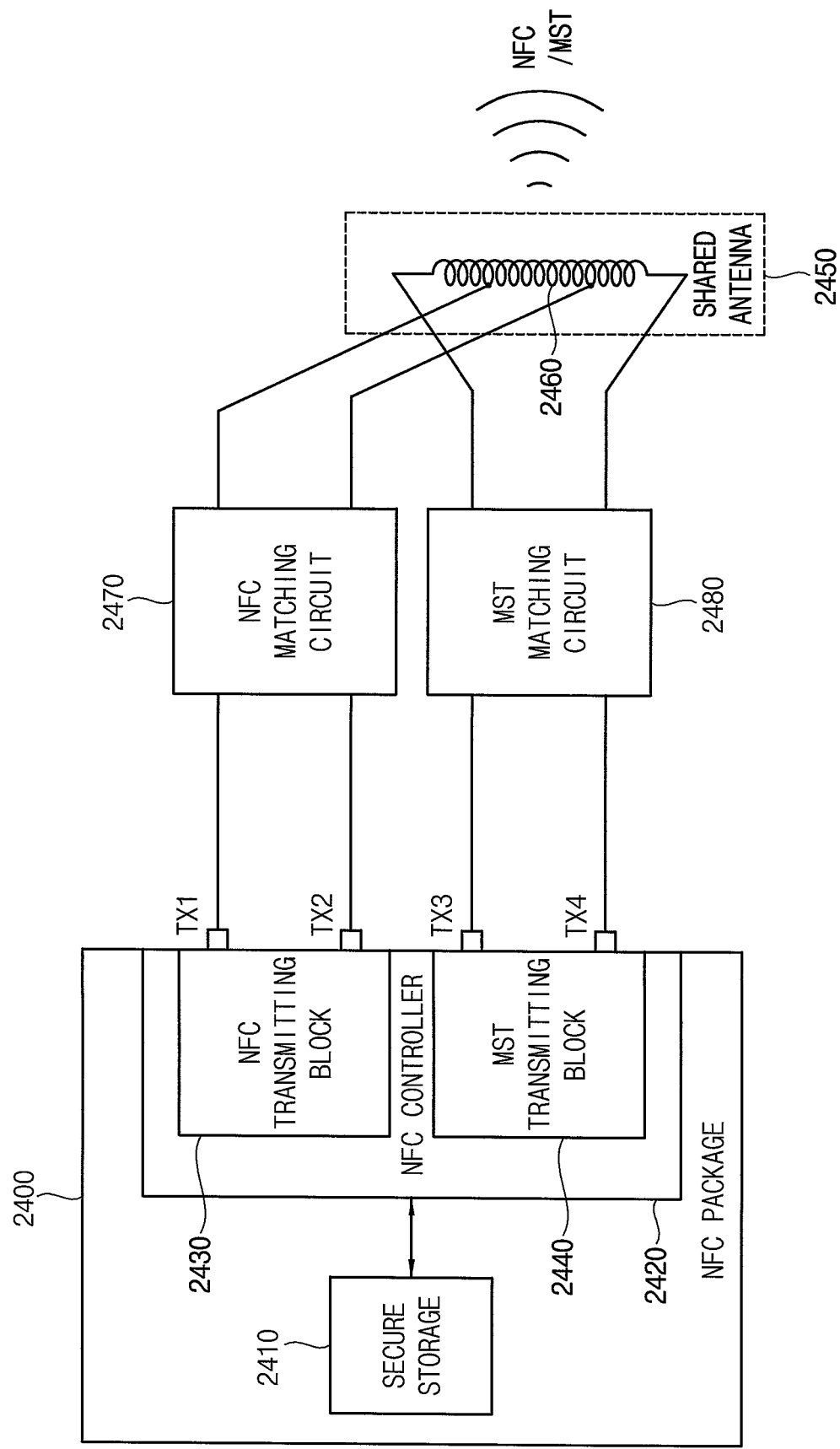
FIG. 24 is a block diagram of a connection relationship between an NFC package and a shared antenna according to an embodiment of the present disclosure.

FIG. 24 is a block diagram of a connection relationship between an NFC package and a shared antenna according to an embodiment of the present disclosure.

Referring to FIG. 24, an NFC package 2400 according to an embodiment of the present disclosure may include a secure storage device 2410 and an NFC controller 2420. The NFC controller 2420 may include an NFC transmitting block 2430 having first and second transmitting terminals TX1 and TX2 connected to a shared antenna 2450, and an MST transmitting block 2440 having third and fourth transmitting terminals TX3 and TX4 connected to the shared antenna 2450.

In an embodiment of the present disclosure, the first and second transmitting terminals TX1 and TX2 of the NFC transmitting block 2430 may be connected to at least part of a shared loop coil 2460 of the shared antenna 2450 via a first impedance matching circuit 2470 (e.g., an NFC impedance matching circuit), and the third and fourth transmitting terminals TX3 and TX4 of the MST transmitting block 2440 may be connected to both ends of the shared loop coil 2460 of the shared antenna 2450 via a second impedance matching circuit 2480 (e.g., an MST impedance matching circuit). The NFC transmitting block 2430 may perform an NFC communication using at least a portion of the shared loop coil 2460 as an NFC antenna in an NFC mode, and the MST transmitting block 2440 may perform an MST communication using the shared loop coil 2460 as an MST antenna in an MST mode.

Figure 25:
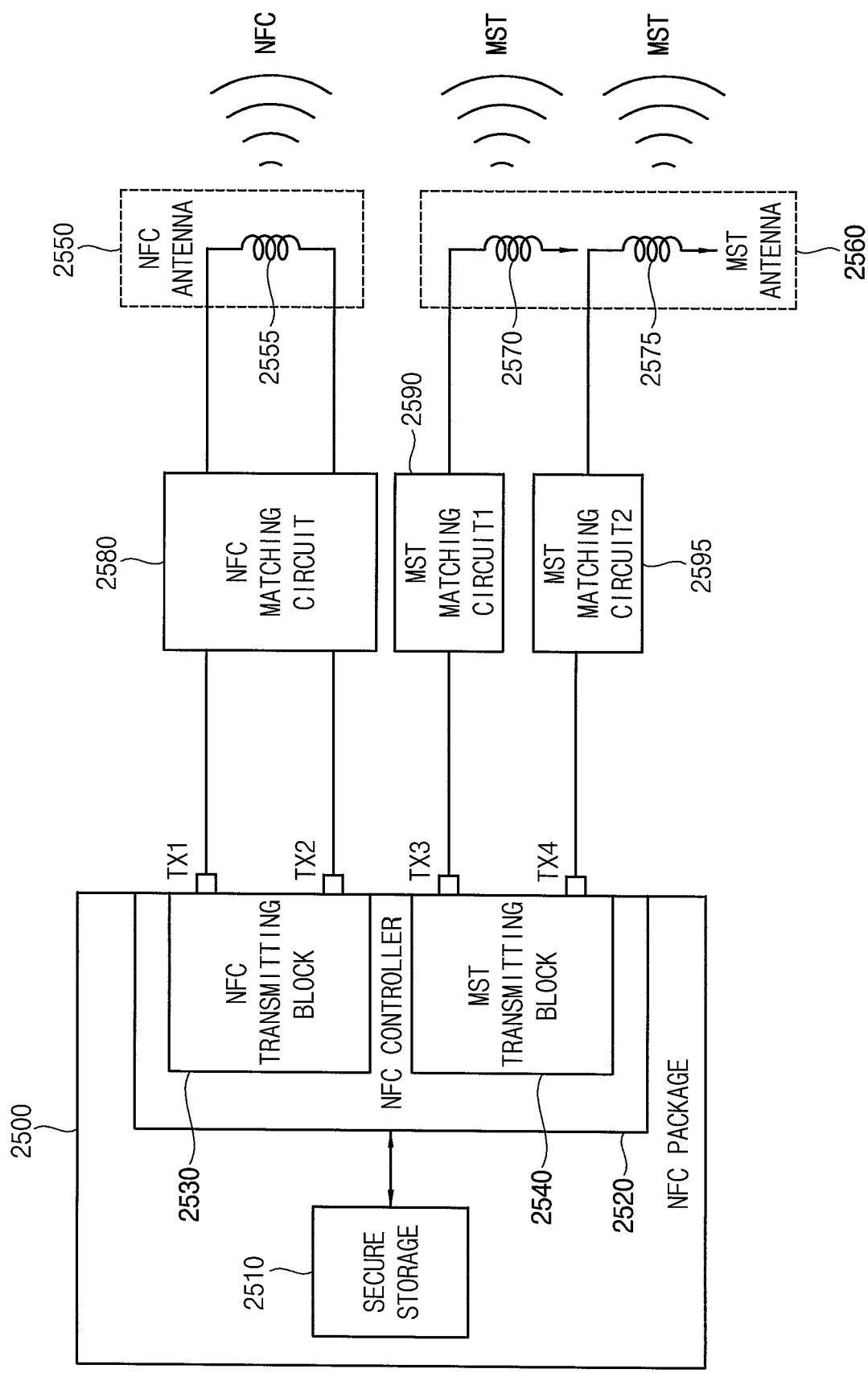
FIG. 25 is a block diagram of a connection relationship between an NFC package and NFC and MST antennas according to an embodiment of the present disclosure.

FIG. 25 is a block diagram of a connection relationship between an NFC package and NFC and MST antennas according to an embodiment of the present disclosure.

Referring to FIG. 25, an NFC package 2500 according to an embodiment of the present disclosure may include a secure storage device 2510 and an NFC controller 2520. The NFC controller 2520 may include an NFC transmitting block 2530 having first and second transmitting terminals TX1 and TX2 connected to an NFC antenna 2550, and an MST transmitting block 2540 having third and fourth transmitting terminals TX3 and TX4 connected to an MST antenna 2560.

In an embodiment of the present disclosure, the NFC antenna 2550 may include a first loop coil 2555, and the first and second transmitting terminals TX1 and TX2 of the NFC transmitting block 2530 may be connected to the first loop coil 2555 of the NFC antenna 2550 via a first impedance matching circuit 2580 (e.g., an NFC impedance matching circuit). The MST antenna 2560 may include a second loop coil 2570 of which one end is grounded and a third loop coil 2575 of which one end is grounded, the third transmitting terminal TX3 of the MST transmitting block 2540 may be connected to the second loop coil 2570 of the MST antenna 2560 via a second impedance matching circuit 2590 (e.g., a first MST impedance matching circuit), and the fourth transmitting terminal TX4 of the MST transmitting block 2540 may be connected to the third loop coil 2575 of the MST antenna 2560 via a third impedance matching circuit 2595 (e.g., a second MST impedance matching circuit). The NFC transmitting block 2530 may perform an NFC communication using the first loop coil 2555, and the MST transmitting block 2540 may perform an MST communication using the second loop coil 2570 and/or the third loop coil 2575.

Figure 26:
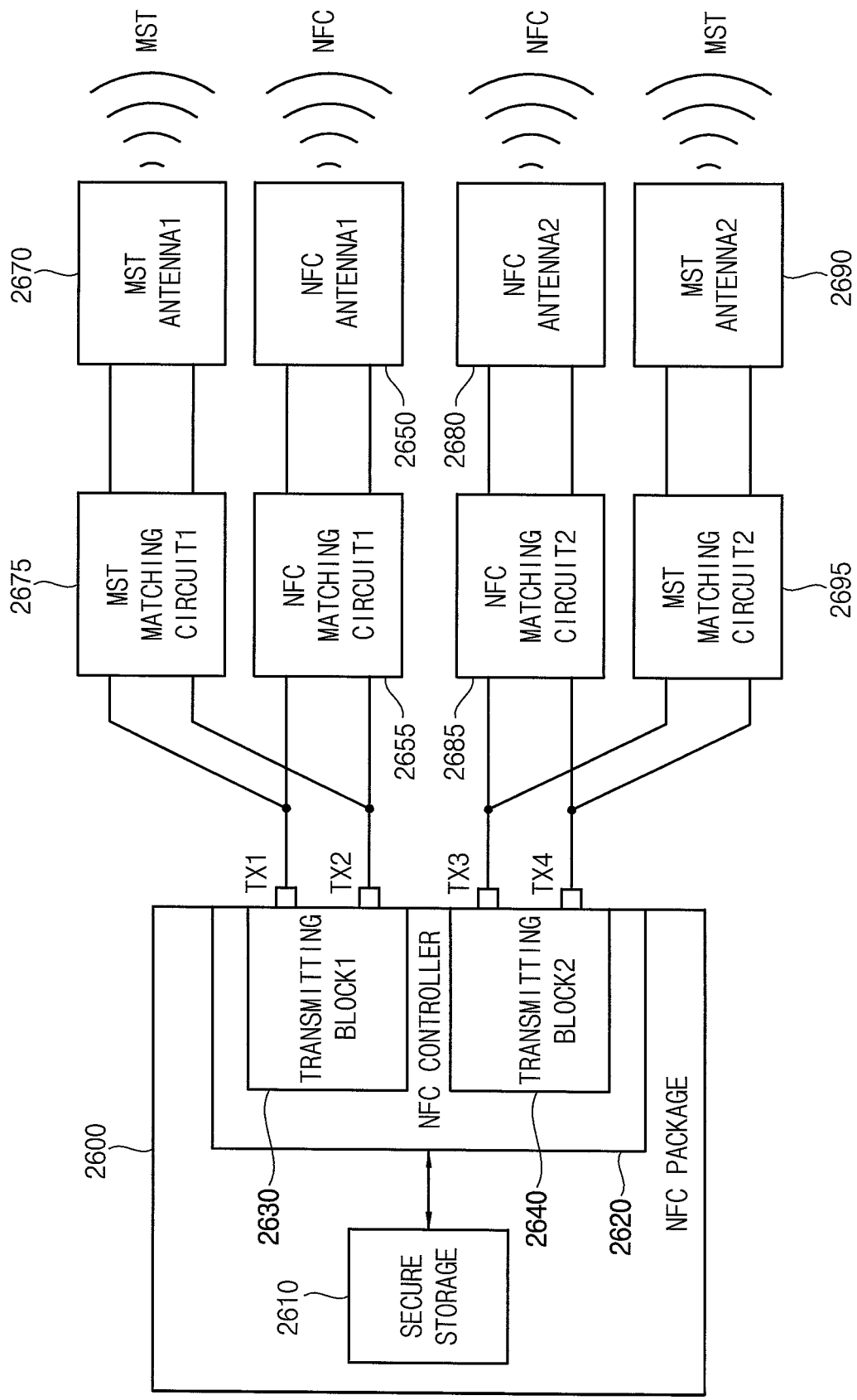
FIG. 26 is a block diagram of a connection relationship between an NFC package and NFC and MST antennas according to an embodiment of the present disclosure.

FIG. 26 is a block diagram of a connection relationship between an NFC package and NFC and MST antennas according to an embodiment of the present disclosure.

Referring to FIG. 26, an NFC package 2600 according to an embodiment of the present disclosure may include a secure storage device 2610 and an NFC controller 2620. The NFC controller 2620 may include a first transmitting block 2630 having first and second transmitting terminals TX1 and TX2 connected to a first NFC antenna 2650 and a first MST antenna 2670, and a second transmitting block 2640 having third and fourth transmitting terminals TX3 and TX4 connected to a second NFC antenna 2680 and a second MST antenna 2690.

The first transmitting block 2630 may selectively perform an NFC communication or an MST communication. For example, the first transmitting block 2630 may drive the first NFC antenna 2650 connected to the first and second transmitting terminals TX1 and TX2 to perform an NFC communication in an NFC mode, and may drive the first MST antenna 2670 connected to the first and second transmitting terminals TX1 and TX2 to perform an MST communication in an MST mode. In an embodiment of the present disclosure, the first NFC antenna 2650 may include a first loop coil, and the first MST antenna 2670 may include a second loop coil. The first and second transmitting terminals TX1 and TX2 of the first transmitting block 2630 may be connected to the first loop coil of the first NFC antenna 2650 via a first impedance matching circuit 2655 (e.g., a first NFC impedance matching circuit), and may be connected to the second loop coil of the first MST antenna 2670 via a second impedance matching circuit 2675 (e.g., a first MST impedance matching circuit). The first transmitting block 2630 may perform an NFC communication using the first loop coil in the NFC mode, and may perform an MST communication using the second loop coil in the MST mode.

The second transmitting block 2640 may also selectively perform an NFC communication or an MST communication. For example, the second transmitting block 2640 may drive the second NFC antenna 2680 connected to the third and fourth transmitting terminals TX3 and TX4 to perform an NFC communication in the NFC mode, and may drive the second MST antenna 2690 connected to the third and fourth transmitting terminals TX3 and TX4 to perform an MST communication in the MST mode. In an embodiment of the present disclosure, the second NFC antenna 2680 may include a third loop coil, and the second MST antenna 2690 may include a fourth loop coil. The third and fourth transmitting terminals TX3 and TX4 of the second transmitting block 2640 may be connected to the third loop coil of the second NFC antenna 2680 via a third impedance matching circuit 2685 (e.g., a second NFC impedance matching circuit), and may be connected to the fourth loop coil of the second MST antenna 2690 via a fourth impedance matching circuit 2695 (e.g., a second MST impedance matching circuit). The second transmitting block 2640 may perform an NFC communication using the third loop coil in the NFC mode, and may perform an MST communication using the fourth loop coil in the MST mode.

As described above, the NFC package 2600 according to an embodiment of the present disclosure may include a plurality of transmitting blocks 2630 and 2640 each selectively performing an NFC communication or an MST communication. Accordingly, the NFC package 2600 according to an embodiment of the present disclosure may perform an MST communication as well as an NFC communication, and thus may support an MST payment service through an MST communication as well as an NFC payment service through an NFC communication. Further, since an MST communication is performed by the NFC package 2600, a dedicated chip for an MST communication is not required, which results in the reduction of cost and size. Further, in an embodiment of the present disclosure, each of the plurality of transmitting blocks 2630 and 2640 may perform an NFC communication in the NFC mode, and/or may perform an MST communication in the MST mode. Accordingly, the communication coverage of an NFC communication and/or an MST communication may be improved.

Figure 27:
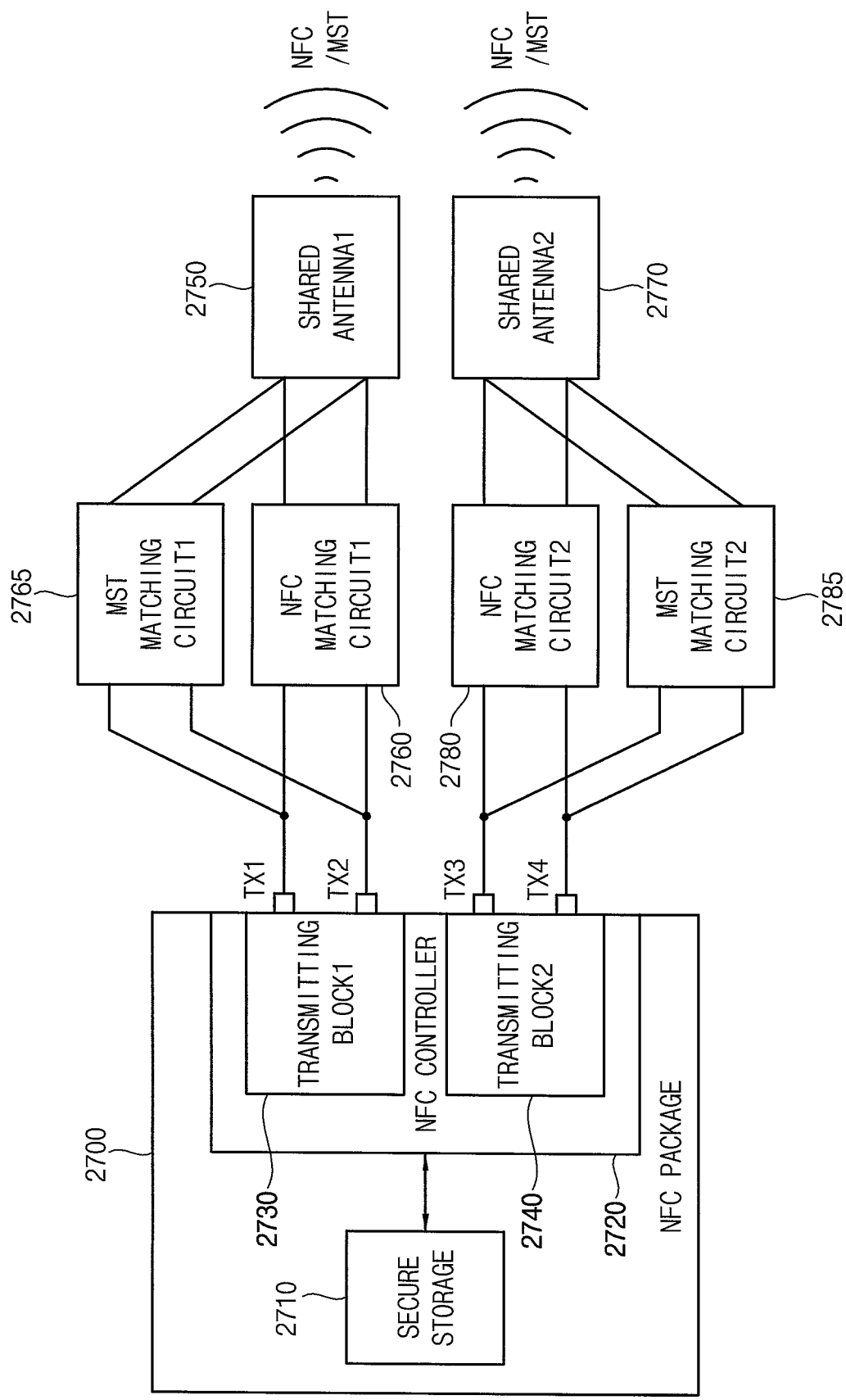
FIG. 27 is a block diagram of a connection relationship between an NFC package and a shared antenna according to an embodiment of the present disclosure.

FIG. 27 is a block diagram of a connection relationship between an NFC package and a shared antenna according to an embodiment of the present disclosure.

Referring to FIG. 27, an NFC package 2700 according to an embodiment of the present disclosure may include a secure storage device 2710 and an NFC controller 2720. The NFC controller 2720 may include a first transmitting block 2730 having first and second transmitting terminals TX1 and TX2 connected to a first shared antenna 2750, and a second transmitting block 2740 having third and fourth transmitting terminals TX3 and TX4 connected to a second shared antenna 2770.

The first transmitting block 2730 may selectively perform an NFC communication or an MST communication. In an embodiment of the present disclosure, the first and second transmitting terminals TX1 and TX2 of the first transmitting block 2730 may be connected to at least part of a first shared loop coil of the first shared antenna 2750 via a first impedance matching circuit 2760 (e.g., a first NFC impedance matching circuit), and may be further connected to both ends of the first shared loop coil of the first shared antenna 2750 via a second impedance matching circuit 2765 (e.g., a first MST impedance matching circuit). The first transmitting block 2730 may perform an NFC communication using at least a portion of the first shared loop coil as a first NFC antenna in the NFC mode, and may perform an MST communication using the first shared loop coil as a first MST antenna in the MST mode.

The second transmitting block 2740 may also selectively perform an NFC communication or an MST communication. In an embodiment of the present disclosure, the third and fourth transmitting terminals TX3 and TX4 of the second transmitting block 2740 may be connected to at least part of a second shared loop coil of the second shared antenna 2770 via a third impedance matching circuit 2780 (e.g., a second NFC impedance matching circuit), and may be further connected to both ends of the second shared loop coil of the second shared antenna 2770 via a fourth impedance matching circuit 2785 (e.g., a second MST impedance matching circuit). The second transmitting block 2740 may perform an NFC communication using at least a portion of the second shared loop coil as a second NFC antenna in the NFC mode, and may perform an MST communication using the second shared loop coil as a second MST antenna in the MST mode.

Figure 28:
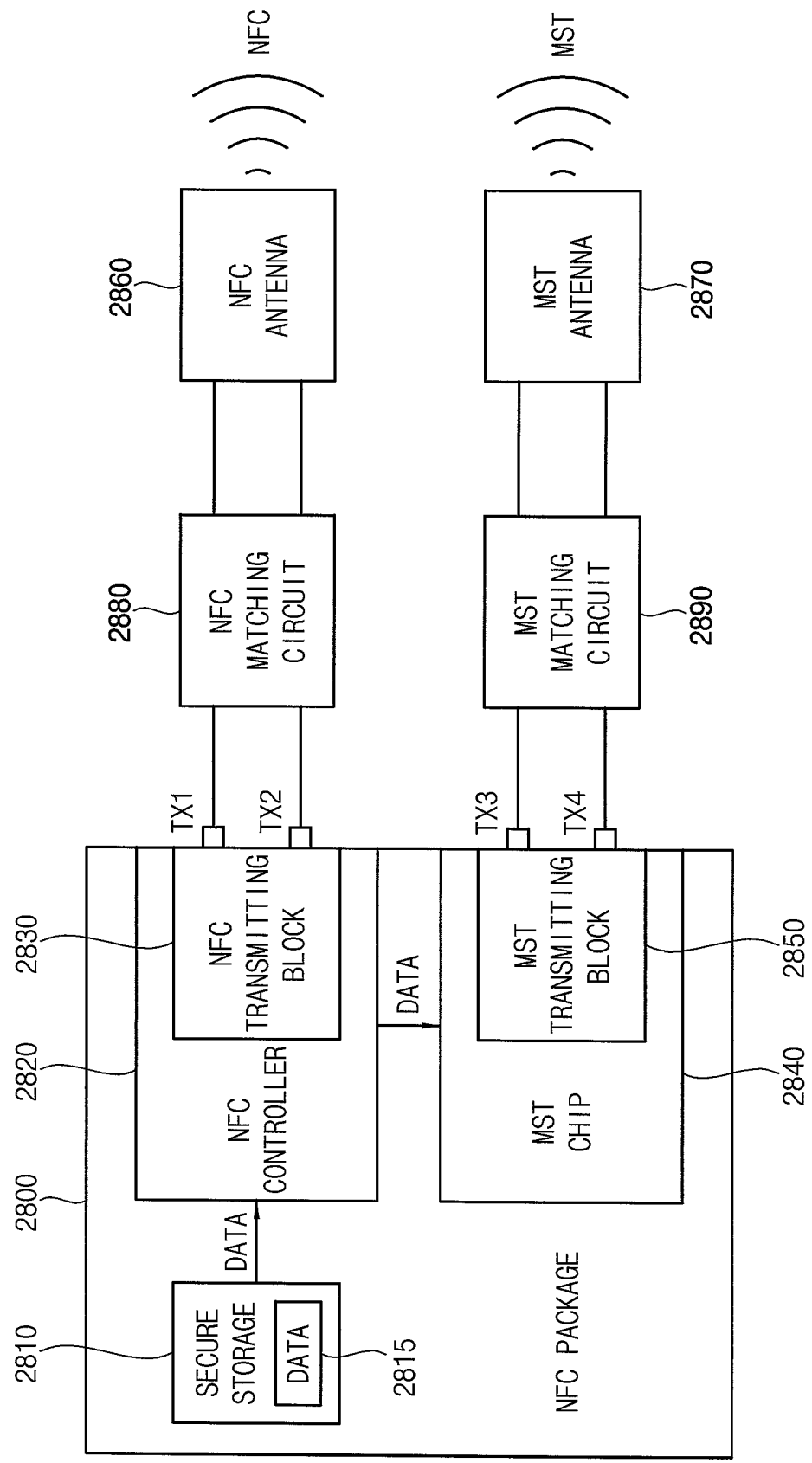
FIG. 28 is a block diagram of a connection relationship between an NFC package and NFC and MST antennas according to an embodiment of the present disclosure.

FIG. 28 is a block diagram of a connection relationship between an NFC package and NFC and MST antennas according to an embodiment of the present disclosure.

Referring to FIG. 28, an NFC package 2800 included in a portable device may include a secure storage device 2810 that stores data 2815, such as payment data, an NFC controller 2820 that receives data 2815 (e.g. DATA) from the secure storage device 2810, and an MST chip 2840 connected to the NFC controller 2820. The secure storage device 2810, the NFC controller 2820 and the MST chip 2840 may be implemented as separate chips or integrated circuit dies, and theses chips may be packaged as one package (i.e., the NFC package 2800) using a SIP technique. In an embodiment of the present disclosure, the secure storage device 2810, the NFC controller 2820 and the MST chip 2840 may be packaged in various forms, such as PoP, BGA, CSP, PLCC, PDIP, DIWP, DIWF, COB, CERDIP, MQFP, TQFP, SOIC, SSOP, TSOP, SIP, MCP, WFP, WSP, etc.

The NFC controller 2820 may provide the data 2815 DATA received from the secure storage device 2810 to a first external terminal (e.g., an NFC reader or an NFC tag) through an NFC communication in an NFC mode. The NFC controller 2820 may include an NFC transmitting block 2830 having first and second transmitting terminals TX1 and TX2 connected to an NFC antenna 2860. The NFC transmitting block 2830 may drive the NFC antenna 2860 to perform an NFC communication in the NFC mode. In an embodiment of the present disclosure, the NFC antenna 2860 may include a first loop coil, and the first and second transmitting terminals TX1 and TX2 of the NFC transmitting block 2830 may be connected to the first loop coil of the NFC antenna 2860 via a first impedance matching circuit 2880 (e.g., an NFC impedance matching circuit). The NFC transmitting block 2830 of the NFC controller 2820 may perform an NFC communication using the first loop coil in the NFC mode. The NFC controller 2820 may transfer the data 2815 DATA received from the secure storage device 2810 to the MST chip 2840 in an MST mode.

The MST chip 2840 may provide the data 2815 DATA received from the NFC controller 2820 to a second external terminal (e.g., an MS reader) through an MST communication in the MST mode. The MST chip 2840 may include an MST transmitting block 2850 having third and fourth transmitting terminals TX3 and TX4 connected to an MST antenna 2870. The MST transmitting block 2850 may drive the MST antenna 2870 to perform an MST communication in the MST mode. In an embodiment of the present disclosure, the MST antenna 2870 may include a second loop coil, and the third and fourth transmitting terminals TX3 and TX4 of the MST transmitting block 2850 may be connected to the second loop coil of the MST antenna 2870 via a second impedance matching circuit 2890 (e.g., an MST impedance matching circuit). The MST transmitting block 2850 of the MST chip 2840 may perform an MST communication using the second loop coil in the MST mode.

As described above, the NFC package 2800 according to an embodiment of the present disclosure may include not only the NFC controller 2820 for an NFC communication but also an MST chip 2840 for an MST communication. Accordingly, the NFC package 2800 according to an embodiment of the present disclosure may perform an MST communication as well as an NFC communication, and thus may support an MST payment service through an MST communication as well as an NFC payment service through an NFC communication. Further, since an MST communication is performed by the NFC package 2800, a dedicated separate chip for an MST communication is not required, which results in the reduction of cost and size. Further, since data 2815 (e.g., credit card data or debit card data) provided by the MST chip 2840 to an external terminal is stored in the secure storage device 2810, the security for the data 2815 may be enhanced.

Figure 29:
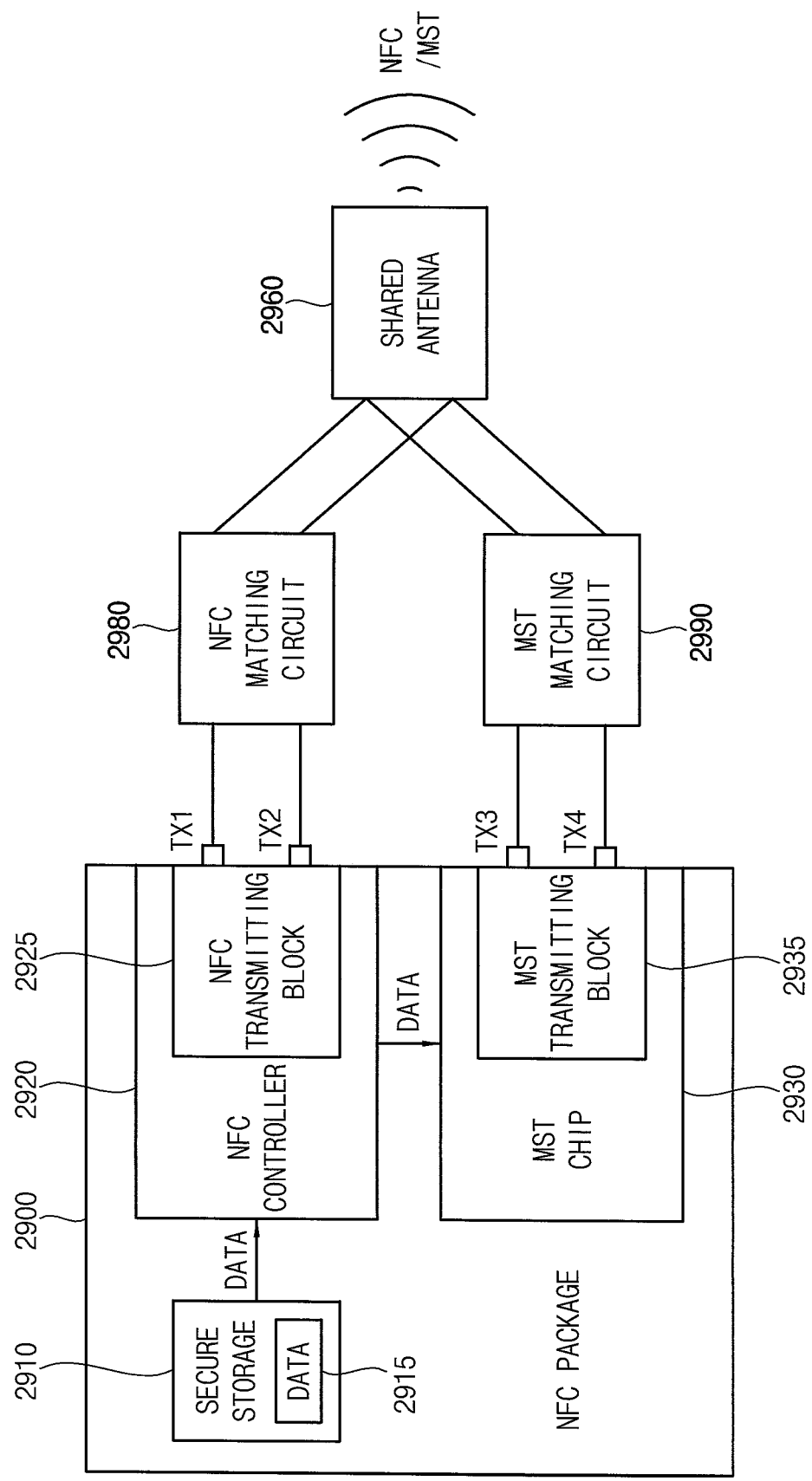
FIG. 29 is a block diagram of a connection relationship between an NFC package and a shared antenna according to an embodiment of the present disclosure.

FIG. 29 is a block diagram of a connection relationship between an NFC package and a shared antenna according to an embodiment of the present disclosure.

Referring to FIG. 29, an NFC package 2900 may include a secure storage device 2910 that stores data 2915, an NFC controller 2920 that receives the data 2915 (e.g. DATA) from the secure storage device 2910, and an MST chip 2930 connected to the NFC controller 2920. The secure storage device 2910, NFC controller 2920 and the MST chip 2930 may be packaged as one package (i.e., the NFC package 2900) using a SIP technique.

The NFC controller 2920 may provide the data 2915 DATA received from the secure storage device 2910 to a first external terminal (e.g., an NFC reader or an NFC tag) through an NFC communication in an NFC mode. The NFC controller 2920 may include an NFC transmitting block 2925 having first and second transmitting terminals TX1 and TX2 connected to a shared antenna 2960. The NFC transmitting block 2925 may drive the shared antenna 2960 to perform an NFC communication in the NFC mode. In an embodiment of the present disclosure, the first and second transmitting terminals TX1 and TX2 of the NFC transmitting block 2925 may be connected to at least part of a shared loop coil of the shared antenna 2960 via a first impedance matching circuit 2980 (e.g., an NFC impedance matching circuit). The NFC transmitting block 2925 of the NFC controller 2920 may perform an NFC communication using at least part of the shared loop coil of the shared antenna 2960 as an NFC antenna in the NFC mode. The NFC controller 2920 may transfer the data 2915 DATA received from the secure storage device 2910 to the MST chip 2930 in an MST mode.

The MST chip 2930 may provide the data 2915 DATA received from the NFC controller 2920 to a second external terminal (e.g., an MS reader) through an MST communication in the MST mode. The MST chip 2930 may include an MST transmitting block 2935 having third and fourth transmitting terminals TX3 and TX4 connected to the shared antenna 2960. The MST transmitting block 2935 may drive the shared antenna 2960 to perform an MST communication in the MST mode. In an embodiment of the present disclosure, the third and fourth transmitting terminals TX3 and TX4 of the MST transmitting block 2935 may be connected to both ends of the shared loop coil of the shared antenna 2960 via a second impedance matching circuit 2990 (e.g., an MST impedance matching circuit). The MST transmitting block 2935 of the MST chip 2930 may perform an MST communication using the shared loop coil of the shared antenna 2960 as an MST antenna in the MST mode.

Figure 30A:
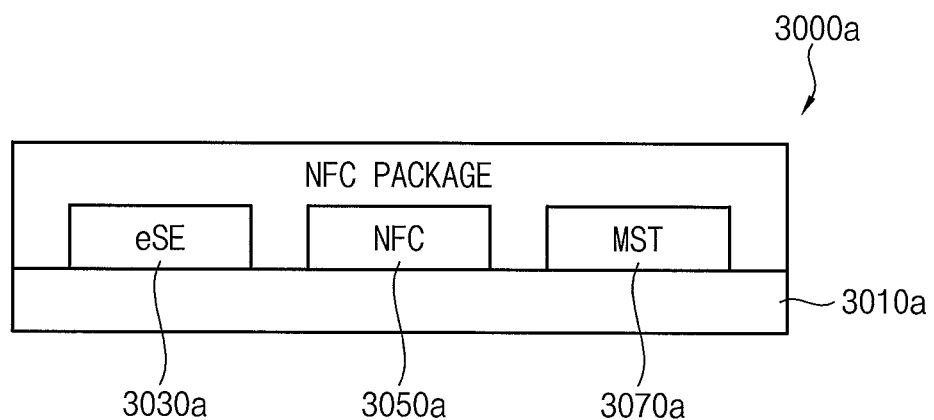
FIGS. 30A and 30B are diagrams of an NFC package according to embodiments of the present disclosure.
Figure 30B:
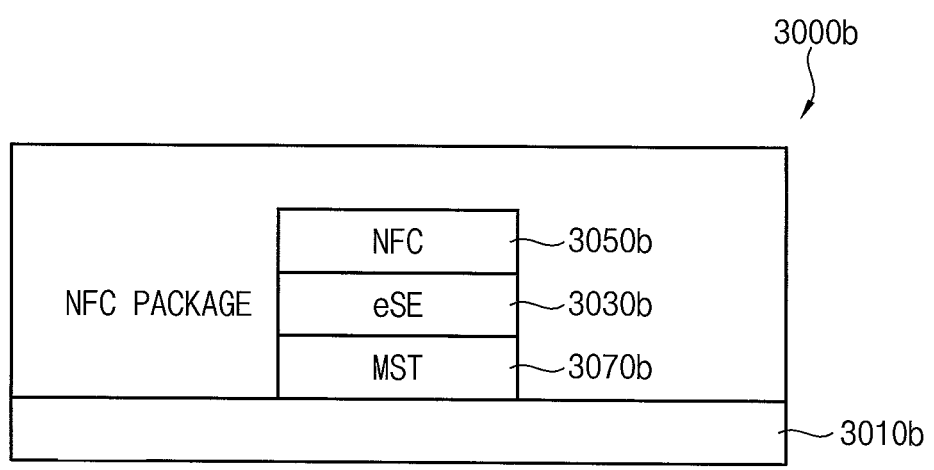

FIGS. 30A and 30B are diagrams of an NFC package according to embodiments of the present disclosure.

The secure storage device 2810 and 2910, the NFC controller 2820 and 2920 and the MST chip 2840 and 2930 illustrated in FIGS. 28 and 29 may be packaged as one NFC package 3000a and 3000b as illustrated in FIGS. 30A and 30B. For example, as illustrated in FIG. 30A, an NFC package 3000a may include a SIP substrate 3010a, and may further include a secure storage device 3030a (e.g., an embedded secure element (eSE)), an NFC controller 3050a and an MST chip 3070a that are disposed on the SIP substrate 3010a. In an embodiment of the present disclosure, the secure storage device 3030a, the NFC controller 3050a and the MST chip 3070a may be connected to each other using wire bonding. In an embodiment of the present disclosure, the secure storage device 3030a, the NFC controller 3050a and the MST chip 3070a may be connected to each other using flip-chip technology. In an embodiment of the present disclosure, as illustrated in FIG. 30B, an NFC package 3000b may include an SIP substrate 3010b, and may further include an MST chip 3070b, a secure storage device 3030b and an NFC controller 3050b that are stacked on the SIP substrate 3010b. In an embodiment of the present disclosure, the chips 3030b, 3050b and 3070b may be stacked in the order of the MST chip 3070b, the secure storage device 3030b and the NFC controller 3050b as illustrated in FIG. 30B, however the present disclosure is not limited thereto. According to an embodiment of the present disclosure, the secure storage device 3030b, the NFC controller 3050b and the MST chip 3070b may be connected to each other using various techniques, such as wire bonding, flip-chip technology, through-silicon-via (TSV), etc.

Figure 31:
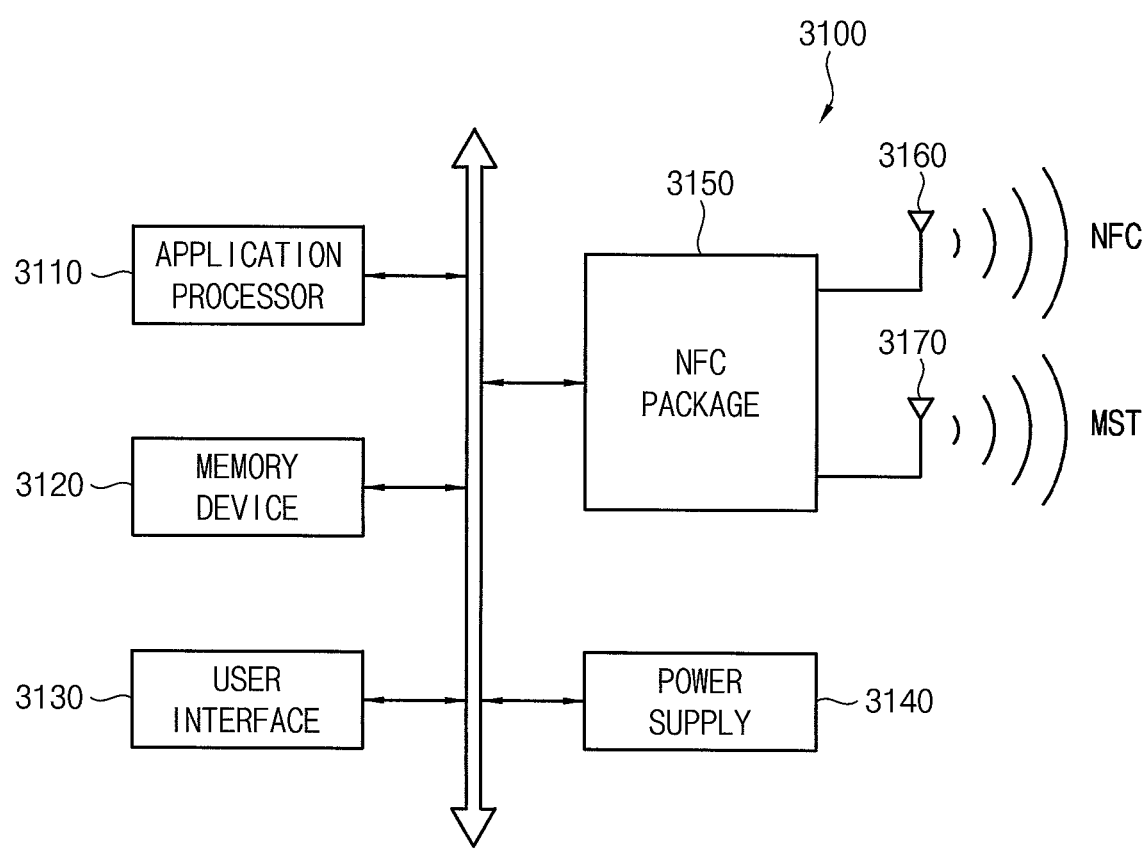
FIG. 31 is a block diagram of a portable device including an NFC package according to an embodiment of the present disclosure.

FIG. 31 is a block diagram of a portable device including an NFC package according to an embodiment of the present disclosure.

Referring to FIG. 31, a portable device 3100 may include an application processor 3110, a memory device 3120, a user interface 3130, a power supply 3140, an NFC package 3150, an NFC antenna 3160 and an MST antenna 3170. The portable device 3100 according to an embodiment of the present disclosure may be any portable electronic device, such as a cellular phone, a smart phone, a tablet computer, a laptop computer, a PDA, a PMP, a digital camera, a music player, a portable game console, a navigation system, etc. In an embodiment of the present disclosure, the portable device 100 may be any wearable electronic device, such as a smart watch, a wrist band electronic device, a necklace type electronic device, a glasses type electronic device, etc.

The application processor 3110 may control an overall operation of the portable device 3100. In an embodiment of the present disclosure, the application processor 3110 may execute various applications, such as an Internet browser, a game application, a video application, etc. In an embodiment of the present disclosure, the application processor 3110 may include a single processor core. In an embodiment of the present disclosure, the application processor 3110 may include multiple processor cores. For example, the application processor 3110 may be a multi-core processor, such as a dual-core processor, a quad-core processor, a hexa-core processor, etc.

The memory device 3120 may store data required for the operation of the portable device 3100. For example, the memory device 3120 may store a boot image for booting the portable device 3100, data transferred to an external device, etc. For example, the memory device 3120 may be implemented with a volatile memory, such as a dynamic random access memory (DRAM), an SRAM, a mobile DRAM, double data rate synchronous DRAM (DDR SDRAM), low power DDR SDRAM (LPDDR SDRAM), graphics DDR SDRAM (GDDR SDRAM), rambus DRAM (RDRAM), etc., and/or a nonvolatile memory, such as an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The user interface 3130 may include at least one input device, such as a keypad, a touch-screen, etc., and at least one output device, such as a speaker, a display device, etc. The power supply 3140 may supply power to the portable device 3100.

The NFC package 3150 may be connected to the NFC antenna 3160 and the MST antenna 3170, and may include a secure storage device that securely stores data. The NFC package 3150 may provide the data stored in the secure storage device to a first external terminal (e.g., an NFC reader or an NFC tag) through an NFC communication using the NFC antenna 3160 in an NFC mode, and may provide the data stored in the secure storage device to a second external terminal (e.g., an MS reader) through an MST communication using the MST antenna 3170 in an MST mode. Since the NFC package 3150 has MST functionality, the NFC package 3150 and the portable device 3100 including the NFC package 3150 may support an MST payment service through an MST communication as well as an NFC payment service through an NFC communication.

In an embodiment of the present disclosure, the portable device 3100 may further include an image processor, a storage device (e.g., a memory card, a solid stage drive (SSD), a hard disk drive (HDD), a compact disk read only memory (CD-ROM), etc.), etc.

In an embodiment of the present disclosure, the portable device 3100 and/or components of the portable device 3100 may be packaged in various forms, such as PoP, BGA, CSP, PLCC, PDIP, DIWP, DIWF, COB, CERDIP, MQFP, TQFP, SOIC, SSOP, TSOP, SIP, MCP, WFP, or WSP.

As described above, the NFC package 3150 and the portable device 3100 according to an embodiment of the present disclosure may perform an MST communication as well as an NFC communication, and thus may support an MST payment service through an MST communication as well as an NFC payment service through an NFC communication.

The present disclosure may be applied to any portable device, such as a smart phone, a tablet computer, or a wearable electronic device, such as a smart watch, a wrist band electronic device, a necklace type electronic device, a glasses type electronic device, etc.

The foregoing is illustrative of embodiments of the present disclosure but should not to be construed as limiting thereof. Although certain embodiments of the present disclosure have been described, those skilled in the art will readily appreciate that many modifications are possible in the embodiments without materially departing from the present disclosure. Accordingly, all such modifications are intended to be included within the scope of the present disclosure as defined by the appended claims and their equivalents. Therefore, it is to be understood that the foregoing is illustrative of certain embodiments of the present disclosure but should not to be construed as being limited to the certain embodiments disclosed herein, and that modifications to the disclosed embodiments, as well as other embodiments, are intended to be included within the scope of the present disclosure as defined by the appended claims and their equivalents.

What is claimed is:

1. A near field communication (NFC) package in a smart phone, comprising:
a secure storage device embedded in the smart phone, wherein the secure storage device is configured to store data; and
an NFC controller embedded in the smart phone, wherein the NFC controller is configured to receive data from the secure storage device, provide the received data to a first external terminal by performing an NFC communication in an NFC mode, and provide the received data to a second external terminal by performing a magnetic secure transmission (MST) communication in an MST mode,
wherein the secure storage device is a secure element having an electronic tamper-resistant function and a mechanical tamper-resistant function,
wherein the NFC controller includes:
a transmitting block having first and second transmitting terminals connected to an NFC antenna and an MST antenna, wherein the transmitting block is configured to drive the NFC antenna connected to the first and second transmitting terminals to perform the NFC communication in the NFC mode, and to drive the MST antenna connected to the first and second transmitting terminals to perform the MST communication in the MST mode,
wherein the NFC antenna includes a first loop coil, and the MST antenna includes a second loop coil,
wherein the first and second transmitting terminals of the transmitting block are connected to the first loop coil of the NFC antenna via a first impedance matching circuit, and are directly connected to the second loop coil of the MST antenna,
wherein the transmitting block is configured to perform an NFC communication using the first loop coil in the NFC mode, and perform an MST communication using the second loop coil in the MST mode,
wherein the first impedance matching circuit includes:
a first capacitor connected between a first end of the first loop coil and a second end of the first loop coil;
a second capacitor connected between the first end of the first loop coil and the first transmitting terminal of the transmitting block; and
a third capacitor connected between the second end of the first loop coil and the second transmitting terminal of the transmitting block, and
wherein the second loop coil includes a first loop configured to form a current path in a counterclockwise direction, and a second loop adjacent to the first loop configured to form a current path in a clockwise direction.

2. The NFC package of claim 1, wherein the transmitting block includes:
a first driver configured to output a first electrical signal to the first transmitting terminal;
a second driver configured to output a second electrical signal to the second transmitting terminal; and
a gate controller configured to control the first driver and the second driver.

3. The NFC package of claim 2, wherein the gate controller is configured to operate the first and second drivers with a first operating frequency in the NFC mode, and operate the first and second drivers with a second operating frequency that is lower than the first operating frequency in the MST mode.

4. The NFC package of claim 2, wherein the gate controller is configured to generate a first switching signal, a second switching signal, a third switching signal and a fourth switching signal,
wherein the first driver includes:
a first p-channel metal oxide semiconductor (PMOS) transistor configured to selectively connect the first transmitting terminal to a first power supply voltage in response to the first switching signal; and
a first n-channel metal oxide semiconductor (NMOS) transistor configured to selectively connect the first transmitting terminal to a second power supply voltage in response to the second switching signal, and
wherein the second driver includes:
a second PMOS transistor configured to selectively connect the second transmitting terminal to the first power supply voltage in response to the third switching signal; and
a second NMOS transistor configured to selectively connect the second transmitting terminal to the second power supply voltage in response to the fourth switching signal.

5. The NFC package of claim 4, wherein the gate controller is configured to generate the first and second switching signals such that a low level period of the first switching signal does not overlap a high level period of the second switching signal, and generate the third and fourth switching signals such that a low level period of the third switching signal does not overlap a high level period of the fourth switching signal.

6. The NFC package of claim 1, wherein the first loop coil and the second loop coil are located in a same layer.

7. The NFC package of claim 6, wherein the first and second loop coils are disposed such that one of the first and second loop coils surrounds another of the first and second loop coils.

8. The NFC package of claim 6, wherein a magnetic sheet is disposed under the first and second loop coils.

9. A method of a communication in a smart phone, comprising:
storing data in a secure storage device in a near field communication (NFC) package embedded in the smart phone;
providing, by an NFC controller in the NFC package embedded in the smart phone, data stored in the secure storage device to a first external terminal by performing an NFC communication using an NFC antenna in an NFC mode; and
providing, by the NFC controller in the NFC package, the data stored in the secure storage device to a second external terminal by performing a magnetic secure transmission (MST) communication using an MST antenna in an MST mode,
wherein the secure storage device is a secure element having an electronic tamper-resistant function and a mechanical tamper-resistant function,
wherein the NFC controller includes:
a transmitting block having first and second transmitting terminals connected to the NFC antenna and the MST antenna, wherein the transmitting block is configured to drive the NFC antenna connected to the first and second transmitting terminals to perform the NFC communication in the NFC mode, and to drive the MST antenna connected to the first and second transmitting terminals to perform the MST communication in the MST mode, wherein the NFC antenna includes a first loop coil, and the MST antenna includes a second loop coil, wherein the first and second transmitting terminals of the transmitting block are connected to the first loop coil of the NFC antenna via a first impedance matching circuit, and are directly connected to the second loop coil of the MST antenna, wherein the transmitting block is configured to perform an NFC communication using the first loop coil in the NFC mode, and perform an MST communication using the second loop coil in the MST mode, wherein the first impedance matching circuit includes:
  a first capacitor connected between a first end of the first loop coil and a second end of the first loop coil;
  a second capacitor connected between the first end of the first loop coil and the first transmitting terminal of the transmitting block; and
  a third capacitor connected between the second end of the first loop coil and the second transmitting terminal of the transmitting block, and wherein the second loop coil includes a first loop configured to form a current path in a counterclockwise direction, and a second loop adjacent to the first loop configured to form a current path in a clockwise direction.

* * * * *